United States Patent
Glezer et al.

(10) Patent No.: US 9,863,313 B2
(45) Date of Patent: *Jan. 9, 2018

(54) POWER GENERATION USING BUOYANCY-INDUCED VORTICES

(71) Applicant: Georgia Tech Research Corporation, Atlanta, GA (US)

(72) Inventors: Ari Glezer, Atlanta, GA (US); Mark Simpson, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 379 days.

This patent is subject to a terminal disclaimer.

(21) Appl. No.: 14/528,107

(22) Filed: Oct. 30, 2014

(65) Prior Publication Data

US 2015/0047352 A1 Feb. 19, 2015

Related U.S. Application Data

(63) Continuation-in-part of application No. 13/390,569, filed as application No. PCT/US2010/046902 on Aug. 27, 2010, now Pat. No. 8,875,509.

(Continued)

(51) Int. Cl.
*F03G 6/04* (2006.01)
*F02C 1/05* (2006.01)
*F03D 9/25* (2016.01)

(52) U.S. Cl.
CPC .............. *F02C 1/05* (2013.01); *F03D 9/25* (2016.05); *F03G 6/045* (2013.01);
(Continued)

(58) Field of Classification Search
CPC .. F02C 1/05; F03D 9/002; F03G 6/045; F05B 2240/132; F05B 2260/24; F05B 2220/60; F05D 2240/127; F05D 2220/60
(Continued)

(56) References Cited

U.S. PATENT DOCUMENTS

| 4,070,131 A | 1/1978 | Yen |
| 4,075,500 A | 2/1978 | Oman et al. |

(Continued)

FOREIGN PATENT DOCUMENTS

WO 00/42320 7/2000

OTHER PUBLICATIONS

PCT International Search Report and Written Opinion in co-pending, reated PCT Application No. PCT/US2010/046902.
(Continued)

*Primary Examiner* — Hoang Nguyen
(74) *Attorney, Agent, or Firm* — Thomas | Horstemeyer LLP; Scott A. Horstemeyer; Randy R. Schoen

(57) ABSTRACT

Various examples are provided for power generation using buoyancy-induced vortices. In one example, among others, a vortex generation system includes an array of hybrid vanes comprising a first vane section in a surface momentum boundary layer and a second vane section above the first vane section. The first vane section is configured to impart a first angular momentum on the preheated air in the surface momentum boundary layer and the second vane section is configured to impart a second angular momentum on preheated air drawn through the second vane section. In another embodiment, a method for power extraction from a buoyancy-induced vortex includes imparting angular momentum to preheated boundary layer air entrained by a thermal plume to form a stationary columnar vortex. The angular momentum can be imparted to the preheated boundary layer air at a plurality of angles by an array of hybrid vanes distributed about the thermal plume.

20 Claims, 13 Drawing Sheets

Related U.S. Application Data

(60) Provisional application No. 61/238,475, filed on Aug. 31, 2009.

(52) U.S. Cl.
CPC ..... *F05B 2220/60* (2013.01); *F05B 2240/132* (2013.01); *F05B 2260/24* (2013.01); *Y02E 10/465* (2013.01); *Y02E 10/725* (2013.01)

(58) Field of Classification Search
USPC ........ 60/641.8, 641.11, 641.12; 290/1 R, 44, 290/55
See application file for complete search history.

(56) References Cited

U.S. PATENT DOCUMENTS

| | | | |
|---|---|---|---|
| 4,222,242 A | 9/1980 | Moseley | |
| 4,275,309 A | 6/1981 | Lucier | |
| 4,309,146 A * | 1/1982 | Hein | F03D 1/04 415/4.2 |
| 4,452,046 A | 6/1984 | Valentin | |
| 6,510,687 B1 | 1/2003 | Zaslavsky et al. | |
| 7,086,823 B2 | 8/2006 | Michaud | |
| 7,154,190 B2 * | 12/2006 | Kaploun | F03D 9/002 290/43 |
| 7,400,057 B2 | 7/2008 | Sureshan | |
| 7,511,387 B2 | 3/2009 | Fakhrai | |
| 7,931,434 B2 | 4/2011 | Raynal | |
| 8,875,509 B2 * | 11/2014 | Glezer | F03G 6/04 290/44 |
| 2003/0201646 A1 * | 10/2003 | Kaploun | F03D 9/002 290/54 |
| 2011/0052369 A1 * | 3/2011 | Michaud | F03D 9/007 415/4.2 |

OTHER PUBLICATIONS

Office Action Received for related IL Application No. 218312, dated Jan. 6, 2014.
Office Action Received for related CA Application No. 2,806,794, dated Feb. 25, 2014.
IL Application No. 218312, filed Aug. 27, 2010, Response to Office Action dated Jan. 6, 2014, filed Sep. 22, 2014.
AU Application No. 2010286556, filed Aug. 27, 2010, Examination Report dated Oct. 7, 2014.
AU Application No. 2010286556, filed Aug. 27, 2010, Response to Examination Report dated Oct. 7, 2014, filed Oct. 21, 2015.
CA Application No. 2806794, filed Aug. 27, 2010, Response to Office Action dated Feb. 25, 2014, filed Aug. 25, 2014.
International Application No. PCT/US2015/061302, filed Nov. 18, 2015, Notification of Transmittal of the International Search Report and the Written Opinion of the International Searching Authority, or the Declaration, dated Jan. 22, 2016.

* cited by examiner

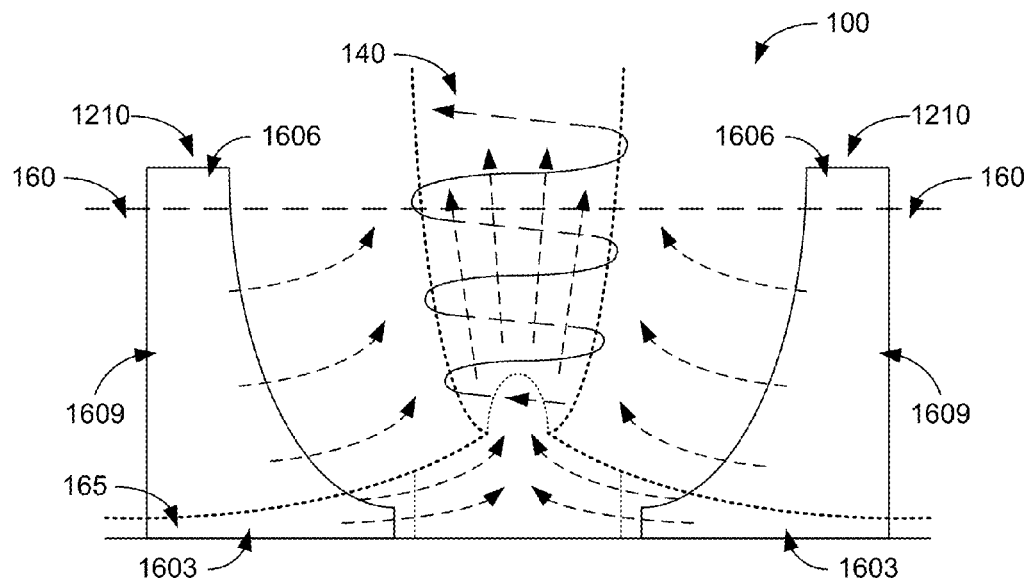
FIGURE 16A
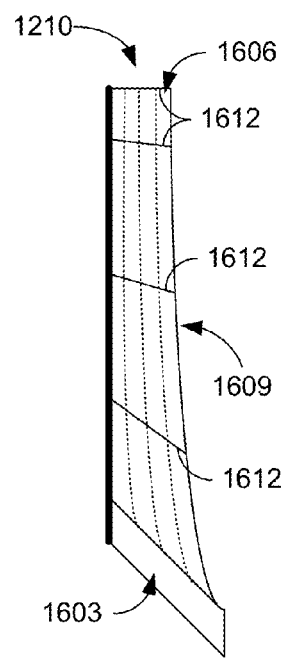 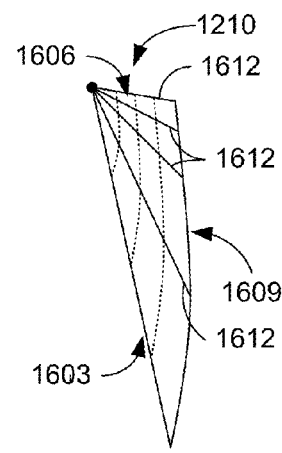
FIGURE 16B          FIGURE 16C

POWER GENERATION USING BUOYANCY-INDUCED VORTICES

CROSS REFERENCE TO RELATED APPLICATIONS

This application is a continuation-in-part of co-pending U.S. patent application entitled "POWER GENERATION USING BUOYANCY-INDUCED VORTICES" having Ser. No. 13/390,569, filed Feb. 15, 2012, which is a 371 application of PCT Application No. PCT/US2010/046902, filed Aug. 27, 2010 and entitled "POWER GENERATION USING BUOYANCY-INDUCED VORTICES," and which claims priority to and the benefit of U.S. provisional application entitled "ELECTRIC POWER GENERATION FROM LOW-GRADE HEAT USING BUOYANCY-INDUCED VORTICES" having Ser. No. 61/238,475, filed Aug. 31, 2009, all of which are hereby incorporated by reference in their entirety.

BACKGROUND

Solar heating of a surface produces thermal layers in the air over the surface. Such naturally-heated air layers occur in hot-climate regions, where air is heated from below by the sun-warmed ground. In these regions, buoyancy-driven vortices (e.g., "dust devils") occur spontaneously and move about the surface before dissipating. In some cases, vortices can exhibit core diameters of up to 50 meters at the surface and heights of up to one kilometer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 16A through 16C illustrate an example of a vortex generation system including an array of hybrid vanes according to various embodiments of the present disclosure.

DETAILED DESCRIPTION

Figure 1:
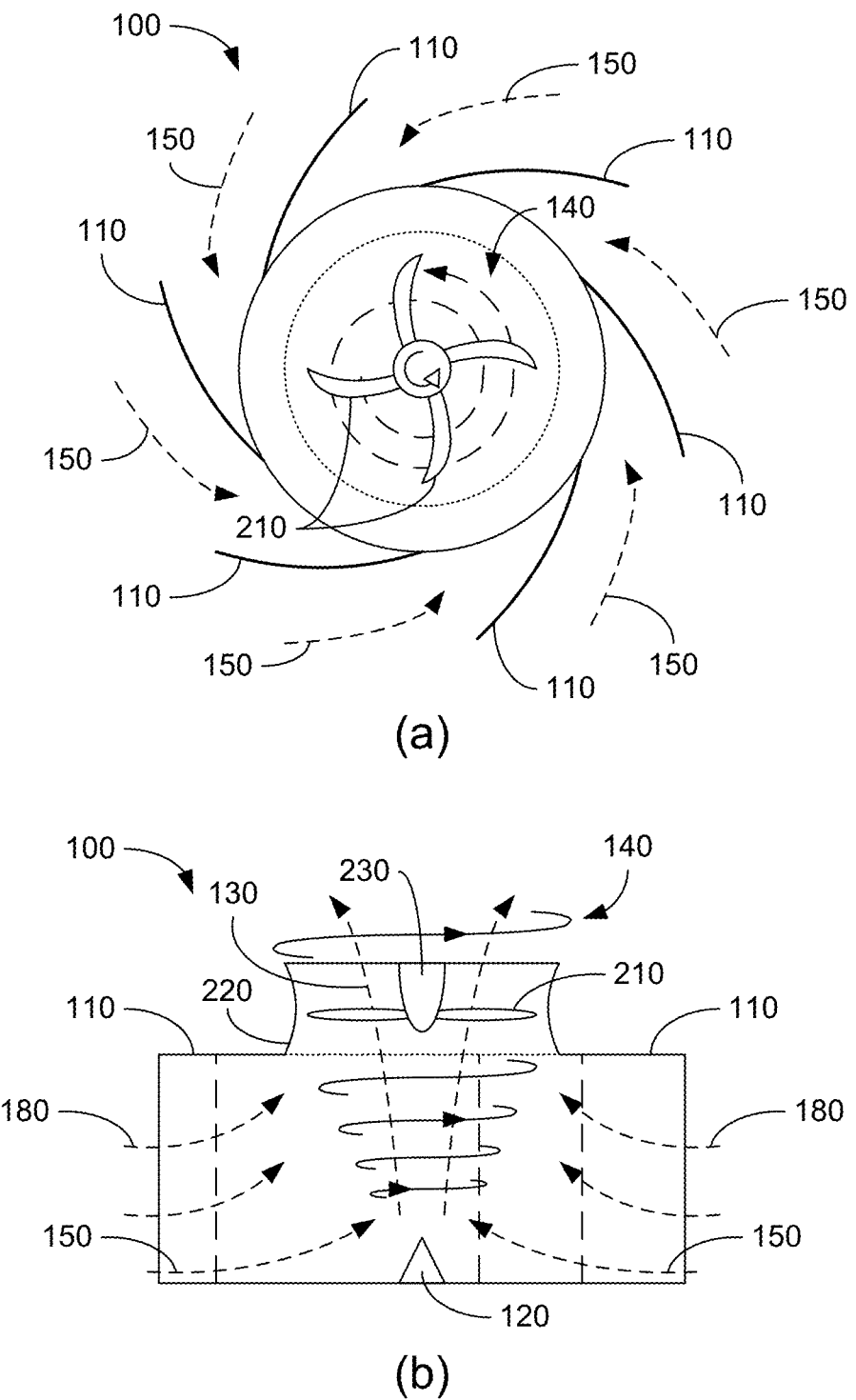
FIG. 1 illustrates a vortex generation system according to various embodiments of the present disclosure.

Disclosed herein are various embodiments of power generation using buoyancy-induced vortices. Reference will now be made in detail to the description of the embodiments as illustrated in the drawings, wherein like reference numbers indicate like parts throughout the several views.

Buoyancy in nature is produced by solar heating of the earth's surface which in turn heats the adjacent layer of air rendering the air layer unstably stratified. This heated air is less dense than the fluid above it and rises as a thermal plume, which can have diameters up to hundreds of meters and exhibit vertical velocities of the order of meters per second. Nominally round rising plumes can spontaneously evolve into a columnar atmospheric vortex (also known as a "dust devil") by the addition of axial vorticity, for example, by a cross wind along the earth surface, with core diameters of 1-50 meters at the surface, and can achieve heights up to one kilometer. As the heated air rises, the axial vorticity becomes concentrated within a core, and the plume begins to spin about its axis. The sense of rotation depends on the sense of the acquired vorticity. Once the rotation begins, the vortex can continue to intensify by the entrainment of heated air from the surface thermal boundary layer into the plume, which adds to its buoyancy; while the radial force produced by the rotation reduces the entrainment of cooler ambient air along the plume's boundary.

This effect results in the concentration of momentum as the rotation forces a tightening of the buoyant structure. The radial pressure gradient created by the vortex creates an inflow of the heated thermal boundary layer air into the plume, intensifying the buoyancy force. These effects result in a considerable amount of angular momentum being present in the columnar vortex, in addition to the vertical momentum produced by the buoyancy. The velocity profile of a dust devil is similar to that of a Rankine vortex, with the "core" rotating in solid body rotation and the outer flow behaving similar to a potential vortex with an axial velocity similar to a thermal plume.

A comparison of naturally occurring dust devils and thermal plumes was completed by Kaimal, J. C. and Businger, J. A. in "Case studies of a convective plume and a dust devil", Journal of Applied Meteorology, vol. 9, no. 4, pp. 612-620 (August 1970), which is hereby incorporated by reference in its entirety. Field measurements demonstrate that the axial fluxes of kinetic and thermal energy in a columnar vortex are at least an order of magnitude larger than the corresponding fluxes in a non-spinning thermal plume that forms under the same conditions. In addition, the tangential velocity and diameter of the strongest rotation of the columnar vortex remained essentially constant with height (e.g., as shown by measurements taken at heights of up to 22 meters). In general, a thermally induced columnar vortex in nature has higher linear momentum than a plume of corresponding scale, in addition to the angular momentum associated with the rotation. The columnar vortex entrains heated air near the surface while being maintained at higher elevations by reduced entrainment of cooler air.

Figure 2:
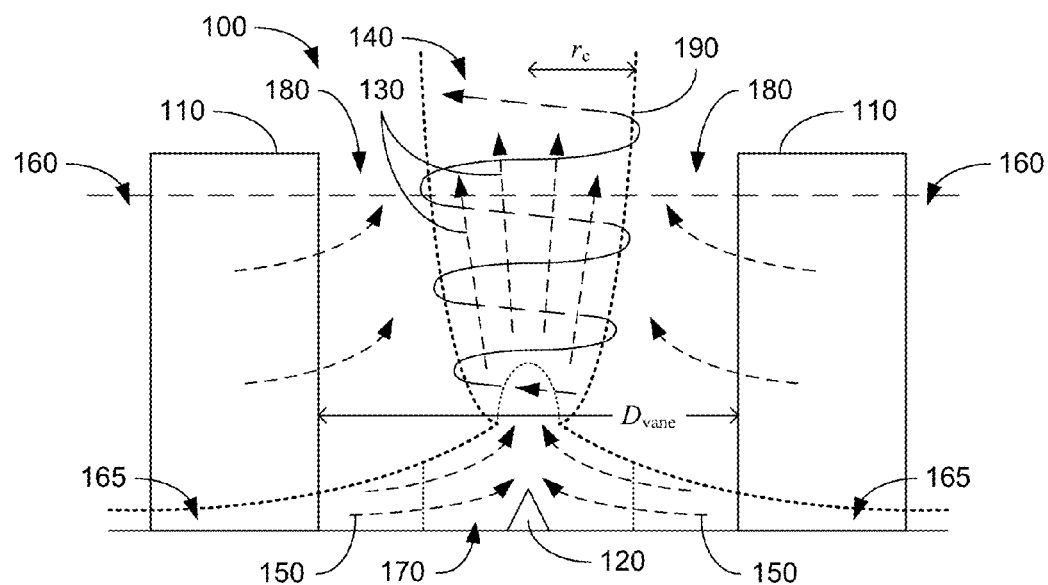
FIG. 2 illustrates a stationary columnar vortex formed within the vortex generation system of FIG. 1 according to various embodiments of the present disclosure.

Buoyancy-induced vortices can be exploited for power generation. With reference to FIG. 1, shown is (a) a top view and (b) a cross-sectional view of an exemplary vortex generation system 100. The vortex generation system 100 includes an array of vanes 110 concentrically distributed about a nucleating obstruction 120. Heating at the nucleating obstruction 120 causes a thermal plume 130 to rise within the vanes 110. The plume 130 can evolve into a stationary columnar vortex 140 by the formation of axial vorticity. Referring to FIG. 2, as the thermal plume 130 rises about the nucleating obstruction 120, air 150 from the heated thermal boundary layer 160 (illustrated schematically by the dashed line) is drawn in through the vanes 110 into the vorticity interaction domain 170 where the surface vorticity is entrained into the buoyant vortex 140 to form its axial core vorticity. The preheated air can be heated in the surface momentum boundary layer over the uncovered surface outside the array of vanes by surface heating. Orientation of the vanes 110 imparts angular momentum that supports the formation of axial vorticity with the surface (momentum) boundary layer 165 illustrated schematically by the dashed line in FIG. 2. The imposed angular motion causes the plume 130 to begin spinning about its axis.

The thermal boundary layer 160 is nominally thicker than the momentum boundary layer 165 (the heated air layer above ground is typically much higher than the vanes). It is noted that while the thermal boundary layer 160 is illustrated in FIG. 2 as located below the top of the vanes 110, the thermal boundary layer 160 may extend above the top of the vanes 110. The structure of the forming vortex has two distinct regimes. The inner region, which defines the characteristic radius 190 and scales with the inner diameter of the vanes, is characterized by a concentration of axial vorticity and the outer region 180 that has angular momentum but is virtually irrotational. Once the rotation of the stationary columnar vortex 140 begins, it can continue to intensify by the entrainment of the radial inflow of the heated air layer 150 from the surface momentum boundary layer 165 and the thermal boundary layer 160.

The stationary columnar vortex 140 can be sustained as long as the unstable thermal stratification of the air at the thermal boundary layer 160 is maintained by surface heating and cooling aloft. In nature, solar heating of surfaces provides a renewable source of energy to heat the thermal boundary layer. Nearly one third of global land mass is desert, providing huge untapped regions for vortex energy harvesting. Desert solar energy is an untapped renewable resource, largely free of adverse environmental impacts, competitive in magnitude with fossil sources, and widely distributed across the planet with a high degree of diurnal and seasonal predictability. Other natural heat sources (e.g., geothermal sources) may also be used for thermal boundary layer 160 heating.

Similarly, waste heat in industrial environments can be used as the source of heated air that forms the buoyancy induced columnar vortex. An advantage in such industrial environments is that once the vortex is formed, the waste heat convectively removed by the air is naturally drawn into the vortex by entrainment without the assistance of mechanical blowers. Industrial waste heat such as, but not limited to, that produced in many manufacturing processes, ovens, kilns, furnaces, extruders, etc., may be utilized to create the thermal boundary layer. Waste heat from data centers can also be used to create the thermal boundary layer along a heat transfer surface (e.g., a roof top). This is an attractive attribute, because natural or industrial heat sources for buoyancy-driven vortices are typically continuously available. In either heating environment the vortex generation system 100 may be installed in a fixed location or may be portable and capable of movement between installations.

Figure 3:
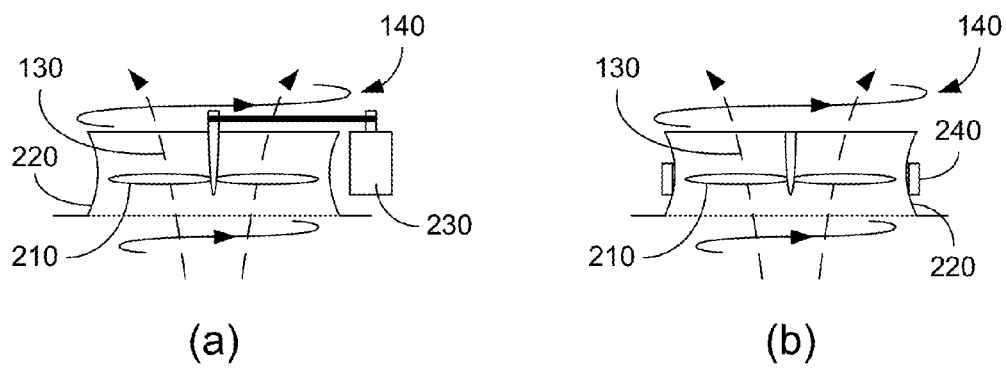
FIGS. 3 and 4 illustrate turbine blade positioning within the vortex generation system of FIG. 1 according to various embodiments of the present disclosure.

Referring back to FIG. 1, placing turbine blades 210 within the stationary columnar vortex 140 allows for extraction of energy from the angular and vertical flow of the vortex 140. In one embodiment, the turbine blades 210 may be located within housing or cowling 220 to assist in harvesting the tangential and axial momentum of the stationary columnar vortex 140 as depicted in FIG. 1(b). In alternative embodiments, the turbine blades 210 may be located above the array of vanes 110 without a housing or cowling 220. In other embodiments, the turbine blades 210 may be located within the array of vanes 110 (see, e.g., FIG. 5(b)). In the exemplary embodiment of FIG. 1, the generator 230 is located within the stationary columnar vortex 140 and directly coupled to the turbine blade 210. In other embodiments, the generator 230 can be located outside the stationary columnar vortex 140. For example, the generator 230 can be located outside the housing or cowling 220, as depicted in FIG. 3(a), or outside the array of vanes 110. In some embodiments, the generator 230 can be located blow the surface supporting the vortex generation system 100. The generator 230 may be coupled to the turbine blades 210 as appropriate. For example, a shaft can extend downward from the from the turbine blades 210, through the surface, and couple with the generator 230. Alternative embodiments, such as the exemplary embodiment of FIG. 3(b), may utilize the turbine blades 210 to form a portion of the rotor of a generator. For example, a rotor winding (or cage) may be distributed about the outer tips of the turbine blades 210. Stator windings 240 distributed about the rotor winding (or cage) to form a generator and allow for conversion of the rotational energy into electrical energy.

Figure 4:
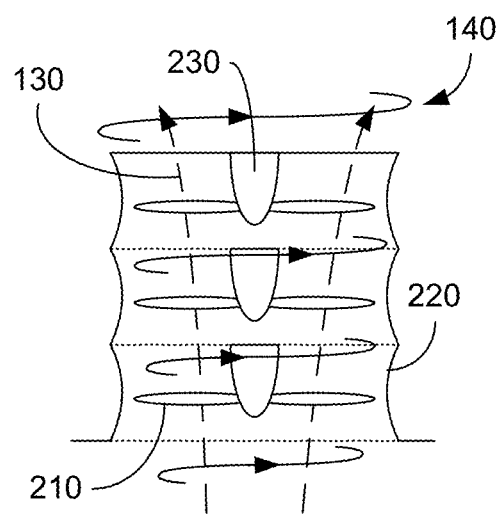

If temperature drop in the air stream across the turbine blades 210 is negligible and the temperature of the stationary columnar vortex 140 remains constant for some height above the surface, the buoyancy force can accelerate the flow axially downstream from the turbine. Given this acceleration and the residual angular momentum within the flow additional turbine blades 210 can be added to capture additional energy in the vortex as illustrated in FIG. 4. Therefore, multiple generators can be beneficial as each stage of turbine blades 210 in buoyancy driven flow would continue to remove some of the energy from the columnar vortex 140. As depicted in FIGS. 1 and 4, one or more levels of turbine blades 210 can be added within housings or cowlings 220 to capture the remaining rotational energy in the vortex. In other embodiments, one or more levels of turbine blades 210 can be provided within the array of vanes 110 (FIG. 5) to capture some of the remaining energy in the vortex. In alternative embodiments, one or more levels of turbine blades 210 can be located within both housings or cowlings 220 and the array of vanes 110.

Figure 12A:
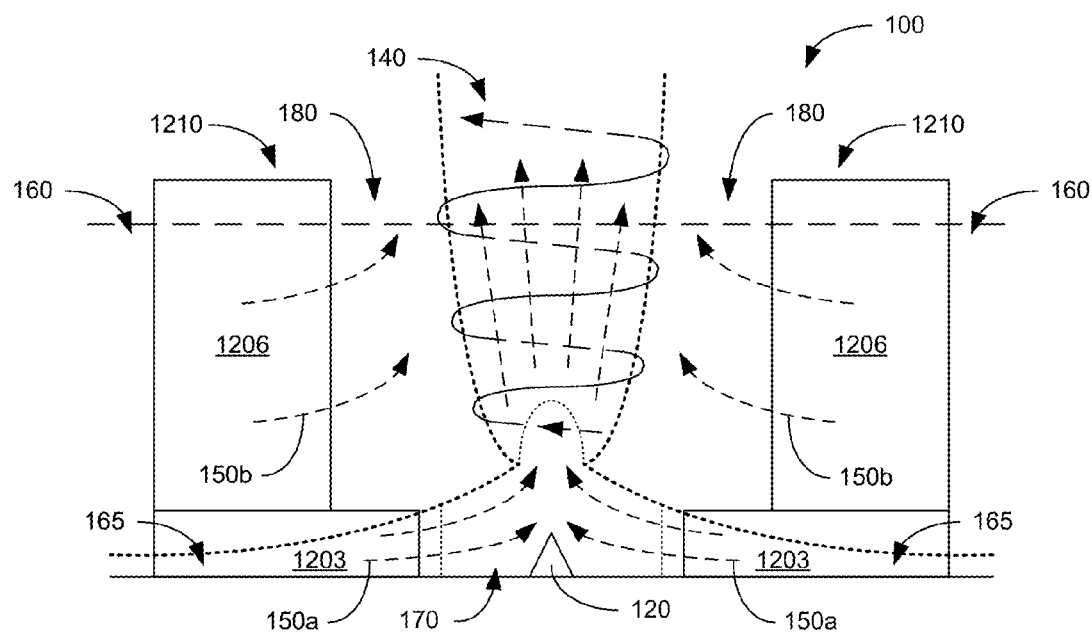
FIGS. 12A and 12B illustrate an example of a vortex generation system including an array of hybrid vanes according to various embodiments of the present disclosure.
Figure 12B:
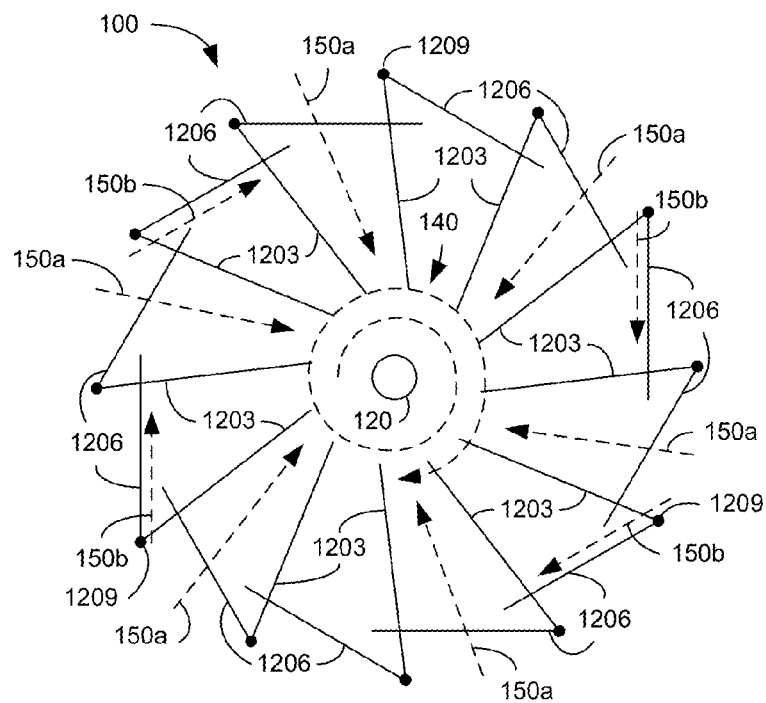
Figure 13A:
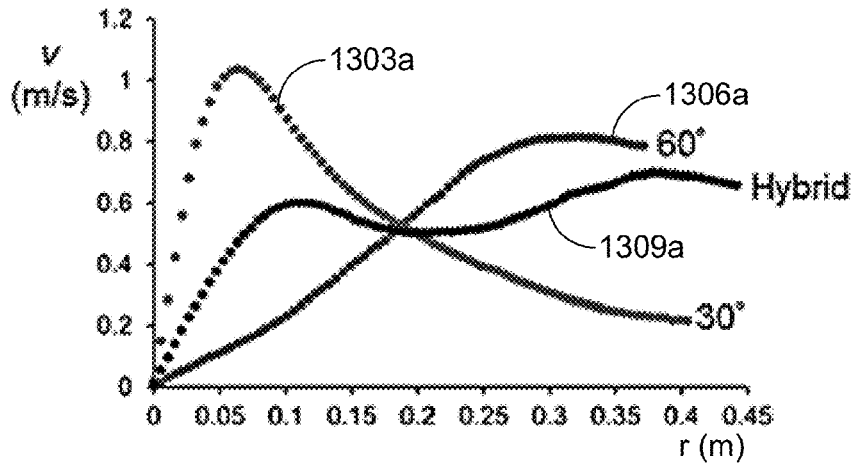
FIGS. 13A through 13C illustrate examples of operating characteristics of the vortex generation system of FIGS. 12A and 12B according to various embodiments of the present disclosure.
Figure 13B:
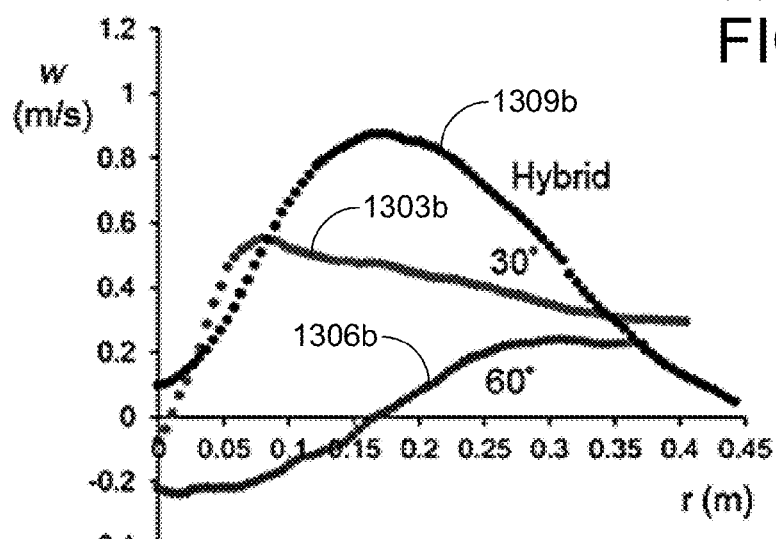
Figure 13C:
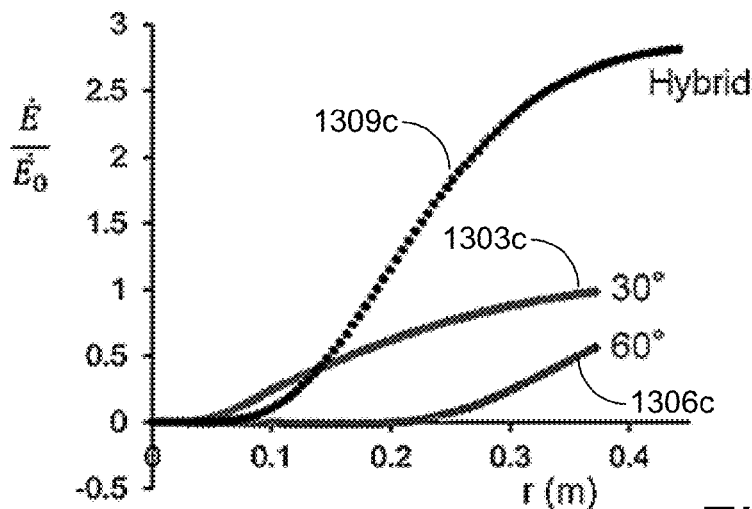

The power that may be produced by the stationary columnar vortex 140 also depends on the radial distribution of tangential and axial velocities. In general, the location of the largest tangential velocity is at the edge of the core flow 190 and decays for larger radial distances. Therefore more torque, or power, can be produced by a stationary columnar vortex 140 with a larger diameter. This is an important consideration for determining the useable power that can be obtained from a single or multiple columnar vortices 140. For a given heat flux into the air, the proposed setup generates a fixed diameter columnar vortex 140. The generated power can increase by optimally increasing the internal vane diameter. Hybrid vanes, such as those illustrated in FIG. 12, can allow the tangential velocity to be redistributed to meet specific operational requirements as shown in FIGS. 13A-13C.

The power that may be captured from a stationary columnar vortex 140 (e.g., by turbine blades at a given elevation) can be estimated by computing the axial and tangential velocity components based upon a model described by Rennó, N. O., Burkett, M. L., and Larkin, M. P. in "A simple thermodynamical theory for dust devils", Journal of the Atmospheric Sciences, vol. 55, no. 21, pp. 3244-3252 (November 1998), which is hereby incorporated by reference in its entirety, and using simple control volume analysis. The distribution of the axial (or vertical) velocity (w) is uniform across the vortex core and decays exponentially outside. The axial velocity component (w) is a function of the sensible heat flux into the air ($F_{in}$), the temperature difference between the convective layer and the surface ($\eta$), the coefficient of viscous dissipation in the atmosphere ($\mu$), and the atmosphere's ability to cool the air in the convective layer by radiation ($8 \epsilon \sigma T_c^3$), that is expressed by:

$$w \approx \left[ \left( \frac{c_p}{8\epsilon\sigma T_c^3} \right) \frac{\eta F_{in}}{\mu} \right]^{1/2}.$$

The tangential (at the edge of the vortex core) velocity component (v) is a function of the universal gas constant (R), the surface mean temperature ($T_s$), the fraction of mechanical energy lost due to viscous effects at the surface ($\gamma$), the horizontal thermal efficiency ($\eta_H$), and $\chi=c_p/R$, that is expressed by:

$$v = \left\{ R\bar{T}_s \left[ 1 - \exp\left( \frac{\gamma\eta}{\gamma\eta-1} \right) \left( \frac{1}{\chi} \right) (\eta_H) \right] \right\}^{1/2},$$

where horizontal thermal efficiency ($\eta_H$) is defined as the ratio of sensible heat flux into the air to total heat flux ($\eta$).

These velocity distributions may be used for the estimation of the axial and rotational power. Given nominal tangential and axial wind speeds of 11 m/s (or 39.5 km/hr) and a 5.2 m core diameter for a columnar vortex 140, a four-blade turbine of a constant aspect ratio 10 and a 10.4 meter diameter can, in principle, extract 63 kW (scaled by Betz's maximum coefficient of performance for both the axial and tangential velocity components).

The formation of the columnar vortex can be enhanced or accelerated by forcing stronger buoyancy within the vorticity interaction domain 170 (FIG. 2) near the ground plane using additional heating In some embodiments, the additional heating can be produced by coatings that are applied on and/or around a nucleating obstruction 120 to absorb additional solar radiation, producing a hot spot on the surface of the vorticity interaction domain 170. In other embodiments, industrial waste heat may be transported to the surface of the vorticity interaction domain 170 through heat exchangers to produce a hot spot. Heating elements may also be installed to produce additional heating within the vorticity interaction domain 170. The heat exchangers and/or heaters may be located in the surface around the nucleating obstruction 120, in the nucleating obstruction 120, or combinations thereof. In alternate embodiments, a heat absorbing mass may be located underground at approximately the center of the vorticity interaction domain 170, e.g., below the nucleating obstruction 120. The heat absorbing mass may aid in the collection and retention of solar radiation to produce a hot spot within the vorticity interaction domain 170. The heat absorbing mass may also prolong the presence of the hot spot within the vorticity interaction domain 170 when cloudy or after sunset.

Figure 5:
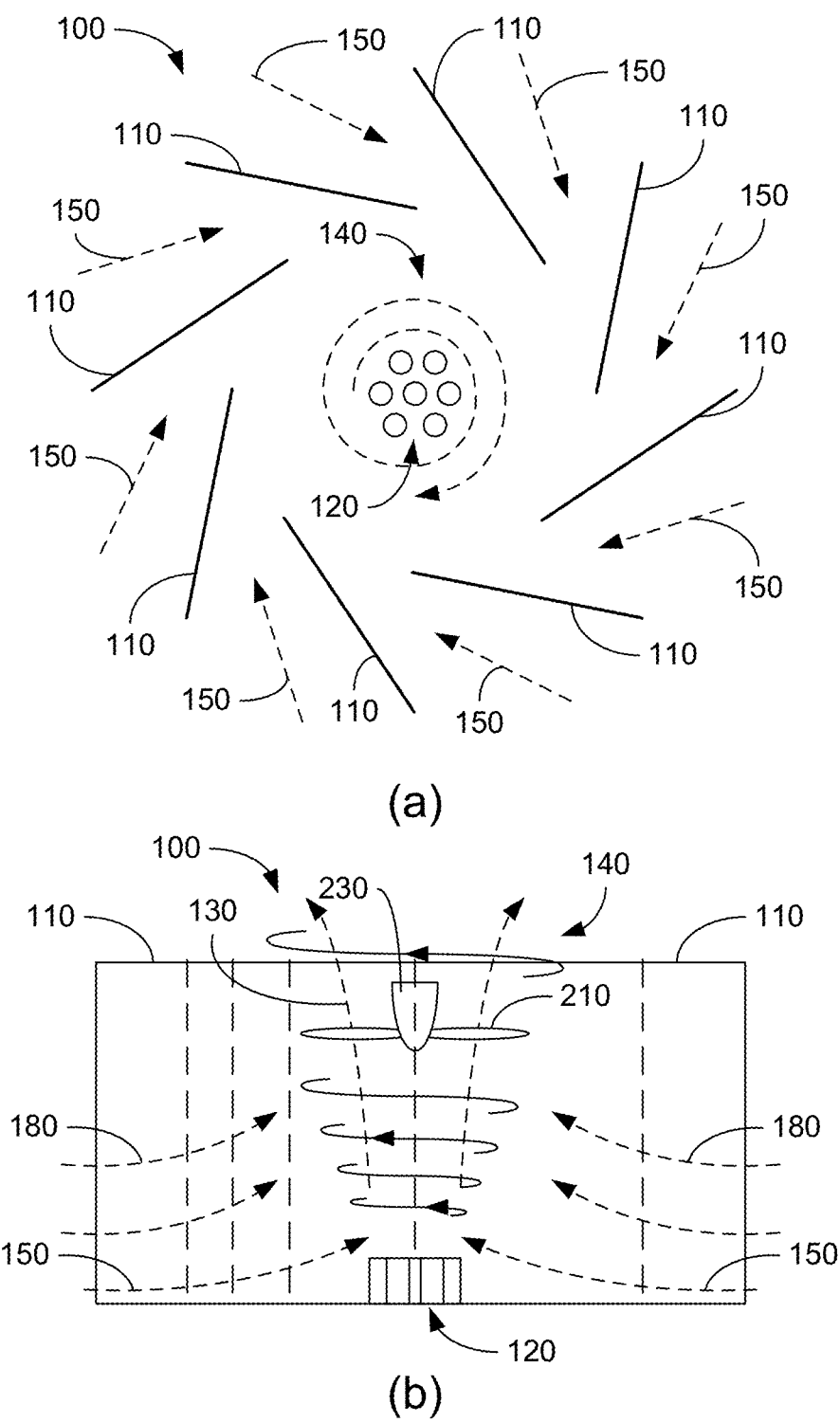

The nucleating obstruction 120, including one or more passive trigger protrusions on the ground plane, can "nucleate" a columnar vortex 140. The nucleating obstruction 120 may be a single passive element such as, but not limited to, a conical protrusion (as illustrated in FIG. 1) or a cylindrical protrusion. Alternative embodiments may use a nucleating obstruction 120 including a plurality of passive elements having solid cylindrical, conical, or airfoil cross-sections in order to produce a range of desired effects. Referring to FIG. 5, the exemplary embodiment includes a ring of six cylindrical elements uniformly distributed along the nominal periphery of the "natural" vortex core with a seventh element at the center. More or less passive elements may also be utilized in other configurations. For example, a ring of three or more cylindrical protrusions concentrically distributed about the center of the vorticity interaction domain 170 to form the nucleating obstruction 120. In addition to anchoring the vortex, the number and spatial distribution of the surface-mounted passive trigger protrusions have two primary effects on the vortex structure and its strength (as measured by its circulation). The first effect is on the distribution and magnitude of vorticity within the vortex core, and the second effect is on the radial spreading of the vortex with elevation. For example, as shown in FIG. 11, the radial spreading of the "natural" vortex is larger than in the presence of the passive (cylindrical) protrusions.

Figure 11:
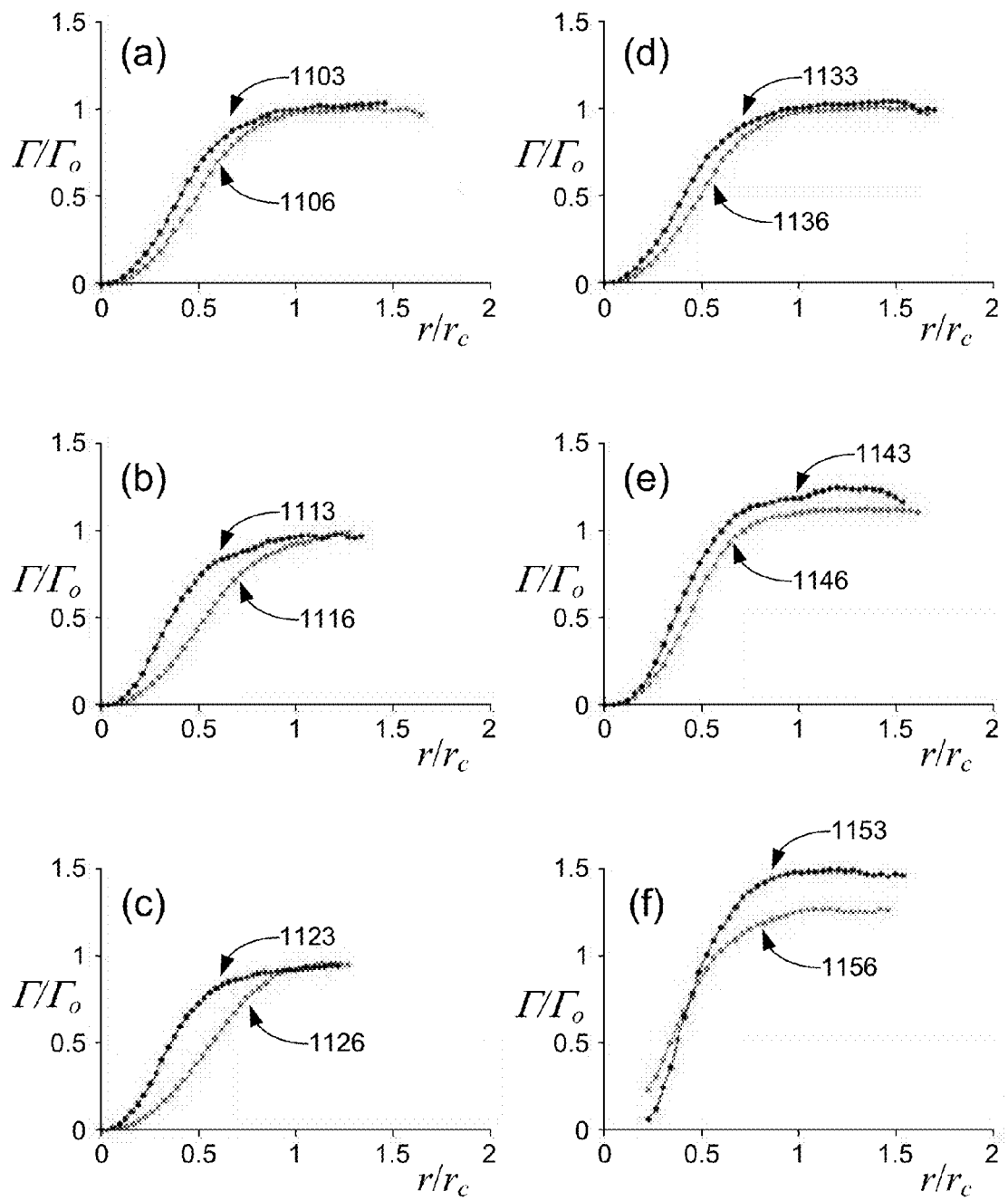

FIG. 11 also illustrates that the total circulation of the vortex may increase by about 5% in the presence of cylindrical protrusions. It should be noted that protrusions having different cross sectional shapes can produce variations in circulation. For example, airfoil cross sections can result in an increase in circulation at a positive angle of attack relative to the oncoming flow. In some embodiments, airfoil cross sections can yield increases of about 10% in circulation relative to the oncoming flow. At the same time the radial spreading of the vortex increases along the vortex axis at an axial rate that is similar to the natural vortex. However, if the angle of attack of the airfoils is negative (relative to the radial flow from the vanes), their effects may become similar to that of the cylinders and the axial spreading of the vortex may be inhibited. In some embodiments, protrusions having a variable cross section (e.g., airfoils or plates) may be controlled to affect vortex properties. The cross section of the protrusions can be adjusted (e.g., manually, using actuators, or using SMA) to achieve the desired affect.

The core circulation of the columnar vortex 140 may also depend on the spatial distribution and number of the surface passive elements. Results indicate that the effects of the protrusions can be additive. For example, an embodiment that helps concentrate the axial vorticity and significantly increase its circulation includes a ring of cylindrical protrusions distributed around the core's edge and a centrally-located protrusion that helps anchor the vortex. This combination yields approximately the sum of the circulations of the center and ring protrusions. The characteristic dimensions of the protrusions are typically selected as a balance between the shed vorticity and the losses (drag).

The characteristic radius of the vortex core is also determined by the radial length scale imposed by the angled vanes. The radial length scale of the columnar vortex 140 may be determined by the (free) cylindrical volume between the vanes 110. For a given internal vane diameter $D_{vane}$ (measured from the tips of the vanes 110 as illustrated in FIG. 2), a vortex diameter $D_c$ ($2 \times r_c$ measured in the absence of a turbine) within which all the vortex core vorticity is contained (and therefore the circulation for $D > D_c$ is invariant) can be defined. The angular momentum of the fluid outside $D_c$ (outer region 180) is nonzero and diminishes asymptotically to zero with increasing radial distance from the vortex centerline. The relationship between internal vane diameter $D_{vane}$ and vortex diameter $D_c$ varies with surface temperature. Based upon experimental measurements (see FIG. 9), $D_c$ decreases with an increase in surface temperature ($T_{surface}=50\text{-}200°$ C.) for a given $D_{vane}$. This may be approximated as a nearly linear decrease from about 0.55 $D_{vane}$ at $T_{surface}=50°$ C. to about 0.31 $D_{vane}$ at $T_{surface}=200°$ C.

Figure 6:
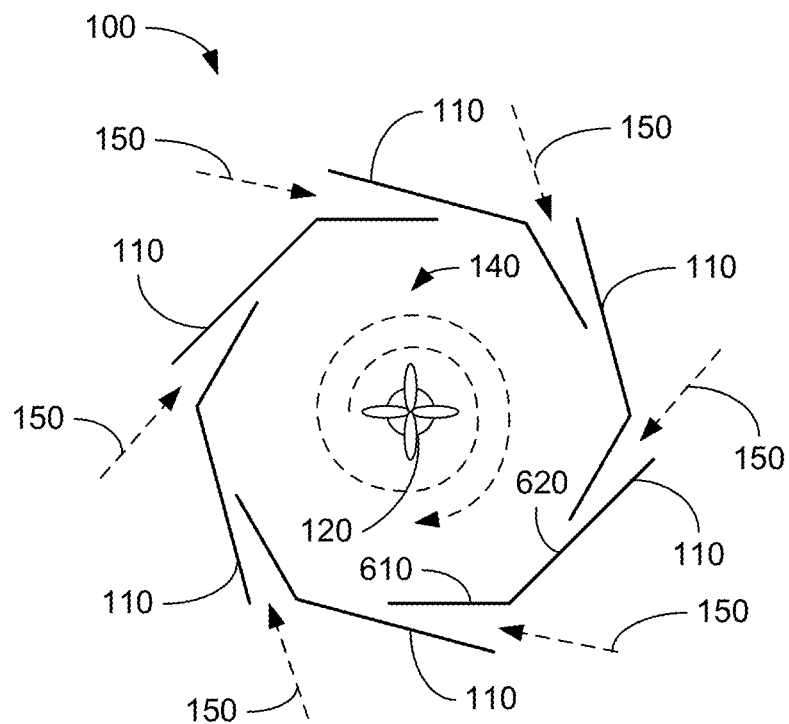
FIGS. 5 and 6 illustrate vortex generation systems according to various embodiments of the present disclosure.

In other embodiments, such as the exemplary embodiment of FIG. 6, a passively rotating mechanism at the center of the vorticity interaction domain 170 may be utilized as the nucleating obstruction 120. The radial entrained flow 150 at the momentum boundary layer 165 spins the device, producing shed vorticity which can be used to enhance the strength and change the shape of the vortex core.

The nucleating obstruction 120 can affect the transport and tilting of the buoyant vortex to form its axial core vorticity. Positioning and distribution of the nucleating obstruction 120 can also alter the core structure of the columnar vortex 140 and/or increase the vortex circulation. Another aspect of the passive protrusions is the nucleation and merging of several adjacent vortices to form a stationary columnar vortex 140 that is stronger than a single "natural" vortex.

The rotation of the formed stationary columnar vortex 140 may be counterclockwise (see, e.g., FIG. 1) or clockwise (see, e.g., FIGS. 5-6) depending on the orientation of the array of vanes 110. Shapes of the vanes 110 can include curved vanes (FIG. 1), straight vanes (FIG. 5), or combinations of shapes such as, but not limited to, angled vanes as depicted in FIG. 6. The array of vanes 110 may also be adjustable or variable, allowing for the adjustment of the positioning angle of the vanes 110. In some embodiments, the vanes 110 may be capable of radial movement to allow for adjustment of the internal vane diameter. By adjusting the positioning of the vanes 110, changes in external conditions may be accommodated for and/or characteristics of the stationary columnar vortex 140 may be adjusted (e.g., the angular momentum of the entrained fluid and/or the core diameter).

A framework supports the array of vanes 110, the turbine blades 210, the cowling 220, and/or the generator 230. In some embodiments, the vanes 110 overlap to inhibit cross-currents from passing directly through the array of vanes 110 and disrupting or extinguishing the stationary columnar vortex 140. The angular and axial momenta of the flow can be varied from a buoyant plume in the absence of axial vorticity (e.g., when the vanes 110 are directed radically) to a strong buoyant vortex which may induce a significant increases in entrainment. The strength of the stationary columnar vortex 140 can be influenced by a balance between the flow angle of the vanes 110 and the resistance they impose on the entrained flow. In addition, the number, height, width, and shape of the vanes 110 can affect the entrained flow from the thermal boundary layer 160 and the air flow 150 in the momentum boundary layer 165. Shapes of the vanes 110 can include curved vanes (FIG. 1), straight vanes (FIG. 5), or combinations of shapes such as, but not limited to, angled vanes as depicted in FIG. 6. The position of all or a portion of a vane 110 may also be adjustable. For example, with reference to the exemplary embodiment of FIG. 6, each vane 110 may pivot as a whole. In alternative embodiments, the exemplary vanes 110 of FIG. 6 can include an inner portion 610 that is fixed and an outer portion 620 that is moveable at the angled point to allow for adjustment of the outer portion. In the exemplary embodiment of FIG. 6, the outer portion overlaps the inner portion of the adjacent vane 110.

In general the height of the vanes 110 and the radius of the array of vanes 110 may be selected for a desired level of power generation. The power to be generated varies with vortex radius, which scales with the diameter of the array of vanes 110. In some embodiments, a plurality of vortex generation systems 100 may be utilized to generate power within a region. Considerations when utilizing a cluster of vortex-driven turbines may include the available real-estate and restrictions to air passage between the vortex generation systems 100, which may inhibit sufficient volume flow rates to individual turbine drives.

Instrumentation may also be included within the vortex generation system 100 for monitoring and control of the system 100. Optical, thermal, and flow sensing devices (e.g., thermocouples and airflow velocity and/or direction sensors) may be distributed within the vortex generation system 100. The instrumentation may be used to monitor characteristics of the stationary columnar vortex 140 such as, but not limited to, axial and tangential air velocities, characteristic radius, and/or air temperature. Signals from the sensing devices can be utilized to control system parameters such as, but not limited to, vane 110 positions and/or turbine blade 210 orientations to improve power capture by the system 100. The turbine blades 210 may be designed for fixed position operation or for variable pitch operation. In some embodiments, the turbine blades 210 include temperature dependent wiring for monitoring. One method, among others, for a "passive" blade adjustment with flow conditions is to alter blade shape, e.g., the blade pitch or twist and/or cross section shape (camber) of the blade. In one embodiment, shape memory alloy (SMA) may be utilized. The SMA can be activated by the ambient temperature without need for powered actuators. Other options can include, but are not limited to, monitoring of the ambient temperature and using some form of powered actuators (e.g., electromagnetic and/or piezoelectric) for "active" control of the blade shape. Adjustments in blade shape can optimize performance (e.g., power output) during different times of the day as temperature or other conditions change. In other embodiments, the turbine blades 210 are constructed of dissimilar metals to passively and/or actively alter blade twist and/or camber. Similar arrangements can be included in the vanes 110 and used for "passive" or "active" performance adjustments.

Figure 7:
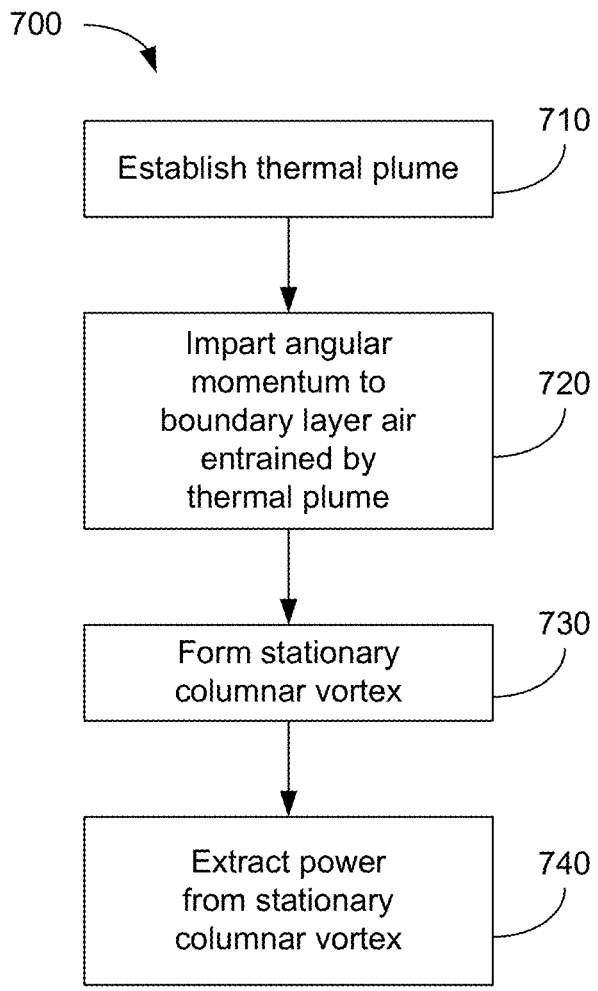
FIG. 7 is a flow diagram illustrating steps for power extraction from a buoyancy-induced vortex according to various embodiments of the disclosure.

Referring to FIG. 7, shown is a flow diagram 700 illustrating steps for power extraction from a buoyancy-induced vortex according to various embodiments of the disclosure. To begin, in block 710, a thermal plume is established. The thermal plume may be established by heating thermal boundary layer air. In some embodiments, the thermal plume is established over a nucleating obstruction. Heating at a surface and/or the nucleating obstruction causes the thermal boundary layer air to rise, thereby entraining warm ambient air. Angular momentum is imparted to the entrained thermal boundary layer air in block 720. Orientation of the vanes 110 imparts angular momentum to the thermal boundary layer air passing through the vanes, causing the thermal plume to begin spinning about its axis and forming stationary columnar vortex 140 (FIG. 2) in block 730. In some embodiments, positioning of the vanes may be varied to adjust the stationary columnar vortex 140. Power may then be extracted from the stationary columnar vortex through turbine blades positioned within the stationary columnar vortex in block 740. In some embodiments, pitch of the turbine blades may be varied to adjust the power extraction.

Investigations of controlled formation and characterization of a stationary columnar vortex 140 in a meter-scale test was performed utilizing a system similar to that depicted in FIG. 6. Ground heating was simulated by a planar controllable 4.8 kW heater (1 m×1 m) covered with an aluminum plate. During the testing, the surface temperature was varied between about 50° C. to about 200° C. Six thin adjustable radial aluminum vanes 110, distributed azimuthally around the center of the plate, were used to impart tangential momentum to the entrained air 150 to sustain a central stationary buoyancy-driven vortex 140. Each vane 110 extended from the surface of the plate and is approximately sixty centimeters high and fifty centimeters wide. Flow diagnostics included smoke visualization and stereo particle image velocimetry (PIV). During testing, the vortex reached a height of about 4 meters with a core diameter varying from about 12 to 24 centimeters.

Figure 8:
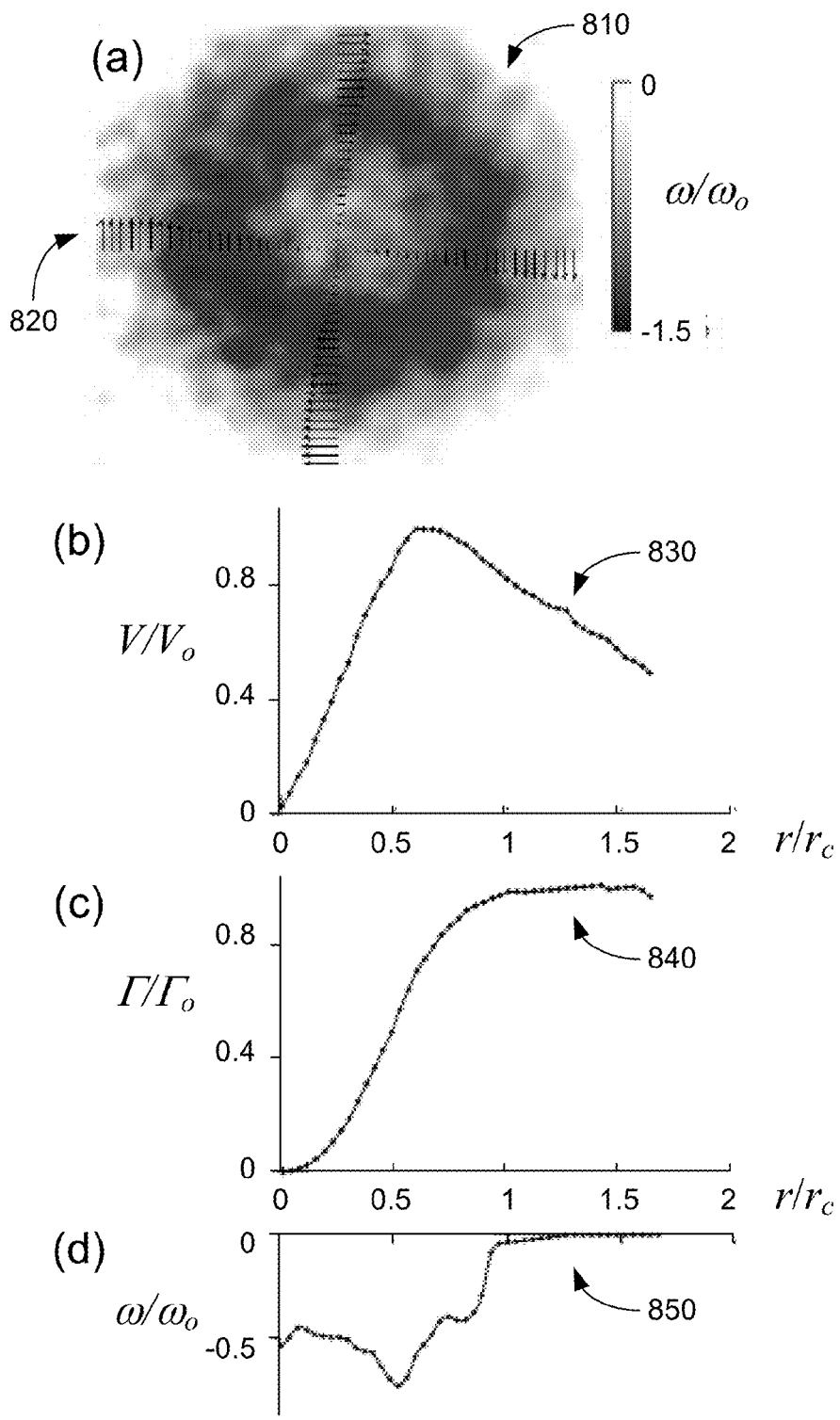
FIG. 8 graphically represents characteristics of a stationary columnar vortex according to various embodiments of the present disclosure.

Referring to FIG. 8, a horizontal cross section through the core of a buoyancy induced columnar vortex 140 is shown in FIG. 8(a) using a raster mapping of the distribution of time-averaged axial (vertical) vorticity ($\omega$) 810 within the core along with radial distributions of the tangential velocity (V) 820 with a surface temperature of 100° C. The horizontal cross section of FIG. 8(a) corresponds to the x-y plane at a height of z=10 cm (above the surface). FIGS. 8(b)-8(d) show the corresponding normalized radial distributions of the time-averaged tangential velocity V(r) 830, circulation $\Gamma$(r) 840, and vorticity $\omega$(r) 850, respectively. For scaling purposes, the characteristic radius of the vortex ($r_c$) is taken to be the location where the circulation becomes radially-invariant (see e.g., FIG. 8(c)). The distributions are normalized by the circulation $\Gamma_o$, peak velocity $V_o$, and the characteristic vorticity $\omega_o = \Gamma_o/r_c^2$ (respectively) at z=10 cm and $T_{surface}$=100° C. The vorticity map 810, and the corresponding line plot 850, shows that the axial vorticity $\omega$(r) is nearly uniformly-distributed within the core for $r/r_c$<0.4, while the tangential velocity V(r) 830 increases linearly with r indicating solid body rotation. The axial vorticity $\omega$(r) 850 is above the core level and has a local maximum for the annular domain within 0.6<$r/r_c$<1.0, before it decays and vanishes outside the core. The circulation $\Gamma$(r) 840 becomes invariant beyond the radial peak of tangential velocity V(r) 830 for r>$r_c$.

Figure 9:
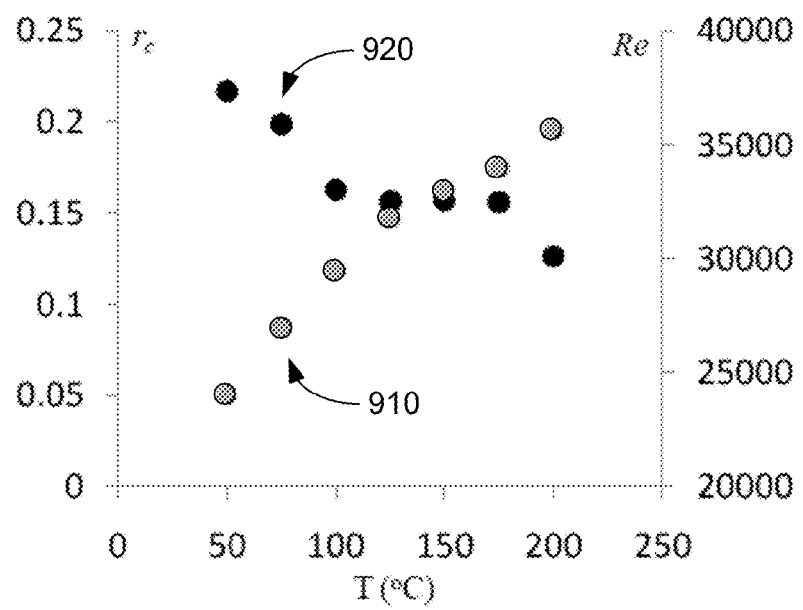
FIG. 9 illustrates variations in columnar vortex characteristics with changes in surface temperature according to various embodiments of the present disclosure.

Referring now to FIG. 9, variations in the characteristics 910 and 920 (i.e., Reynolds number Re=$\Gamma$/v, and characteristic radius $r_c$, respectively) of the stationary columnar vortex 140 with changes in surface temperature ($T_{surface}$=50-200° C.) are shown (at z=0.6 $r_c$). The data plots 910 and 920 illustrate that while the vortex strength (and Re 910) increases with the buoyancy force produced by the surface temperature, its characteristic radius 920 actually decreases, indicating that the magnitude of the vorticity within the core increases significantly and with it the angular momentum of the core fluid. The increase in characteristic circulation with $T_{surface}$ may be limited during testing by the ability of the surface to convectively heat the entrained air 150 (FIG. 2) owing to its limited planar dimensions.

Evolution of the buoyancy-driven columnar vortex 140 is affected by the flow within the vorticity interaction domain 170 (FIG. 2) which can modify the transport and tilting of the surface momentum boundary layer vorticity into the buoyant vortex 140 to form its axial core vorticity. A nucleating obstruction 120 can affect the formation and structure of the stationary columnar vortex 140. For example, distributions of passive trigger objects on the ground plane of the vorticity interaction domain 170 can "nucleate" a columnar vortex 140 and alter its core structure and/or increase its circulation. The passive protrusions can also cause the nucleation and merging of several adjacent vortices to form a stationary columnar vortex 140 that is significantly stronger than a single "natural" vortex.

Testing was performed comparing the characteristics of a "natural" vortex formed without a nucleating obstruction 120 and a stationary columnar vortex 140 formed with a nucleating obstruction 120 similar to that illustrated in FIG. 5. The nucleating obstruction 120 included a ring of six cylindrical elements uniformly distributed along the nominal periphery of the "natural" vortex core along with a seventh element at the center. Other combinations of passive elements (e.g., number of elements, placement, and shape of the elements, e.g., cylindrical, conical, or airfoil cross sections) may be utilized in order to produce a range of desired effects. During testing, the protrusions were solid cylinders placed upright on the solid surface, each having a height and diameter of 0.15 $r_c$ and 0.1 $r_c$, respectively, with $r_c$=16 cm. The increase in core circulation of the columnar vortex 140 can depend on the spatial distribution and number of the surface passive elements.

Figure 10:
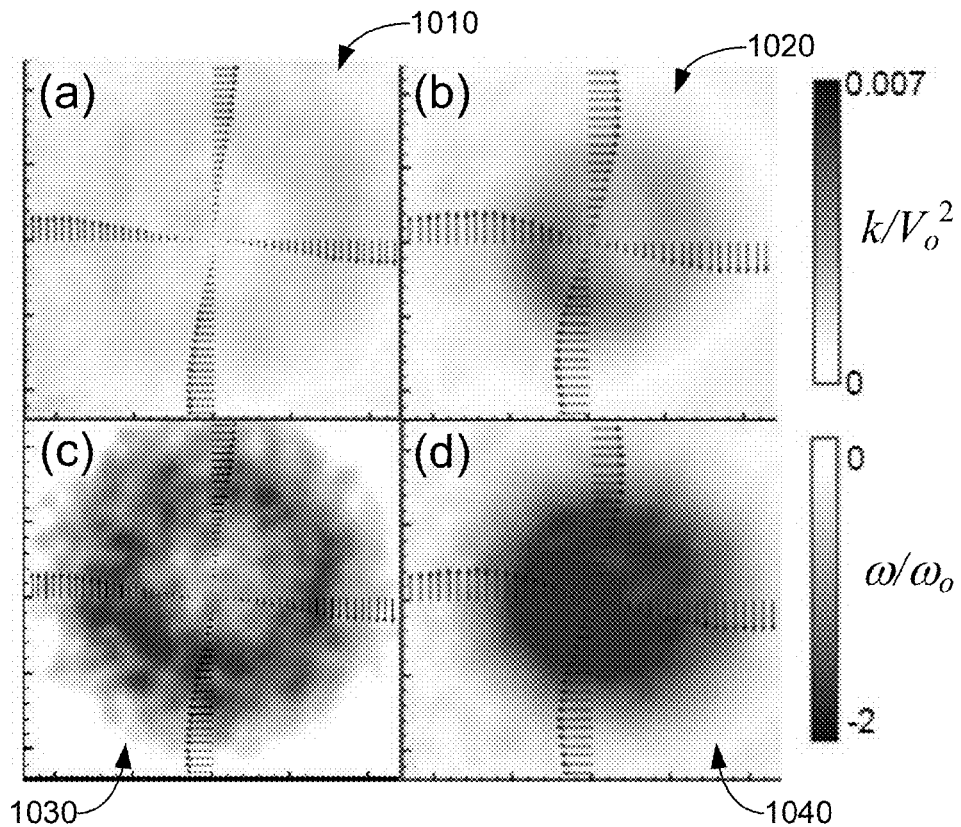
FIGS. 10 and 11 illustrate differences in characteristics of a stationary columnar vortex and a "natural" vortex according to various embodiments of the present disclosure.

Referring next to FIG. 10, shown are raster mappings illustrating the distribution of the kinetic energy (TKE of FIGS. 10(a)-10(b)) and the axial vorticity ($\omega$ of FIGS. 10(c)-10(d)) within a horizontal cross section through the core of the "natural" vortex (FIGS. 10(a) & 10(c)) and a horizontal cross section through the core of the buoyancy induced columnar vortex 140 (FIGS. 10(b) & 10(d)) formed with the 7-element nucleating obstruction 120 described above. The data of FIG. 10 was measured at z=10 cm and $T_{surface}$=100° C. Comparison of the "natural" vortex mappings 1010 and 1030 and the stationary columnar vortex mappings 1020 and 1040, respectively, shows that the presence of the passive elements of the nucleating obstruction 120 results in a significantly smaller core when the nucleating obstruction 120 is included. The measurements indicate that the characteristic radius of the columnar vortex 140 formed with the seven passive elements is 89% of the characteristic radius of the "natural" vortex ($r_{c\text{-"nucleated"}}$=0.89 $r_{c\text{-"natural"}}$) under these conditions. Additionally, the presence of the 7-element nucleating obstruction 120 leads to an increase in circulation where $\Gamma_{\text{"nucleated"}}$=1.05 $\Gamma_{\text{"natural"}}$. These measurements show that the interaction of the passive elements with the entrained air 150 (FIG. 2) near the center of the vortex core affects the structure of the columnar vortex 140. Placement of the passive elements farther away from the core center diminishes their effect. Dimensions and orientation of the passive elements can also affect the structure of the columnar vortex 140. Combinations of elements of different shapes and/or dimensions may also affect the structure of the columnar vortex 140.

The radial variation of the circulation ($\Gamma$) of the stationary columnar vortex 140 by the 7-element passive protrusions is shown in FIG. 11. Circulation variations are illustrated in FIGS. 11(a)-11(c) for elevations of $z/r_c$=0.6, 1.2, and 1.8, respectively, and in FIGS. 11(d)-11(f) for surface temperatures of $T_{surface}$=100° C., 150° C., and 200° C., respectively. With reference to FIGS. 11(a)-11(c), although there is no net increase in circulation ($\Gamma$) when $T_{surface}$=100° C., comparing the plots 1103, 1113, and 1123 of the stationary columnar vortex 140 with the plots 1106, 1116, and 1126 (respectively) of the "natural" vortex, it can be seen that the core radius of the stationary columnar vortex 140 is less than the core radius of the "natural" vortex at all three elevations (0.89 $r_c$ at $z/r_c$=0.6, 0.78 $r_c$ at $z/r_c$=1.2, and 0.62 $r_c$ at $z/r_c$=1.8). The increase in the circulation of the stationary columnar vortex 140 with surface temperature is evident in FIGS. 11(d)-11(f). Comparing the plots 1133, 1143, and 1153 of the stationary columnar vortex 140 with the plots 1136, 1146, and 1156 (respectively) of the "natural" vortex, it can be seen that the presence of the 7-element nucleating obstruction 120 leads to a remarkable additional increase in circulation (1.05 $\Gamma_{"natural"}$ at $T_{surface}$=100° C., 1.24 $\Gamma_{"natural"}$ at $T_{surface}$=150° C., and 1.49 $\Gamma_{"natural"}$ at $T_{surface}$=200° C.). These results indicate that the passive manipulation of the nucleating obstruction 120 becomes more effective when the buoyancy force of the columnar vortex 140 is stronger.

As has been described, a vortex generation system 100 can form and maintain a vortex 140 using an array of radially-located, azimuthal flow vanes 110 configured to impart angular momentum on preheated air in the surface momentum boundary layer as that air is entrained through the vanes 110 by the deliberately-triggered vortex. While the vanes 110 have been presented as a single blade set at an angle that is sufficient to impart angular momentum on the entrained flow, other geometries can also be utilized in the vortex generation system 100. For example, improvements to the vortex 140 can be achieved by decoupling the geometry of the lowest extent of each azimuthal flow vane 110 from the remaining vertical section of the vane 110. Other geometric configurations of the vanes 110 can also be used to enhance the formation and performance of a deliberately triggered, columnar vortex 140.

The vortex 140 can be sensitive to changes in the azimuthal flow vanes 110, including the distribution of kinetic energy in the air flow. For given thermal resources, the effects of the vanes 110 are indirect in that only the characteristics of the entrained air flow into the vortex generation system 100 are affected. While these indirect effects can form and maintain a buoyancy-induced vortex 140, they may not optimize the engendered vortex 140. Referring to FIGS. 12A and 12B, shown are graphical representations of an example of a vortex generation system 100 including hybrid vane geometry, where the lowest extent of the array of hybrid vanes 1210 is decoupled from an upper portion of the hybrid vanes 1210 to enhance entrainment and tailor the air flow to maximize power extraction. The hybrid flow vanes 1210 alter the evolution of the isolated vortex 140 by manipulating the vorticity and momentum transport within the vortex generation system 100 in order to increase the mechanical power by tailoring and enhancing the distribution and axial flux of kinetic energy.

The vortex generation system 100 includes an array of hybrid vanes 1210 concentrically distributed about a nucleating obstruction 120. In other implementations, a vortex 140 can be established without the use of a nucleating obstruction 120 in the vortex generation system 100. In the example of FIGS. 12A and 12B, each hybrid vane 1210 includes a lower vane section 1203 (or first tier) and an upper vane section 1206 (or second tier). As shown in the cross-sectional view of FIG. 12A, the lower vane section 1203 of the hybrid vane 1210 is adjacent to the surface of the ground and below the upper vane section 1206. The height of the lower vane section 1203 is a fraction of the height of the upper vane section 1206, while the width of the lower vane section 1203 is larger than the width of the upper vane section 1206. Different combinations can be utilized for a range of thermal resources and environmental conditions. The internal portion of the vortex generation system 100, within the array of hybrid vanes 1210, can be separated into three distinct regions: a near-surface swirling boundary layer 165, the vortex 140 "inner" core flow, and the "outer" flow induced by the vortex 140 in the outer region 180. The hybrid vane 1210 can be configured to tailor the vertical profile of each hybrid vane 1210 to enhance the flow domain it directly affects.

A swirling trajectory of the surface boundary layer 165 can produce a significant loss in momentum owing to the viscous effects at the surface. The orientation of the lower vane section 1203 of each hybrid vane 1210 directs the trajectory of the surface boundary layer 165 to radially funnel the air 150a towards the vortex core, which supports the formation of axial vorticity. As the thermal plume 130 rises about the nucleating obstruction 120, air 150a from the heated surface (momentum) boundary layer 165 is drawn in through the lower vane sections 1203 of the hybrid vanes 1210 into the vorticity interaction domain 170 where the surface vorticity is entrained into the base of the buoyant vortex 140. The imposed angular motion causes the plume 130 to begin spinning about its axis. In some implementations, a nucleating obstruction 120 is not needed to establish the vortex 140. Air passing through the hybrid vanes 1210 can be directed and/or conditioned to initiate the formation of the vortex 140 within the array of hybrid vanes 1210. The preheated air can be heated in the surface momentum boundary layer over the uncovered surface outside the array of vanes by surface heating.

The upper vane section 1206 of each hybrid vane 1210 provides stability and protection for the core of the vortex 140 and a boundary condition for the tangential velocity for the outer flow. Once the rotation of the stationary columnar vortex 140 begins, it can continue to intensify by the entrainment of the radial inflow of the heated air 150 from the surface momentum boundary layer 165 and the thermal boundary layer 160. Additional air 150b is drawn into the vortex 140 from the heated thermal boundary layer 160 through the upper vane sections 1206 of the hybrid vanes 1210, which can be oriented at a different angle than the lower vane section 1203. By directing the flow of air 150 at two (or more) different angles, the evolution of the vortex 140 can be altered or manipulated by influencing the magnitude and location of momentum transport into the flow enclosure to enhance the flux of kinetic energy. The hybrid vanes 1210 can be constructed from a variety of materials such as, but not limited to, cloth, wood, plastic, metal or other appropriate construction material.

As shown in the top view of FIG. 12B, the lower vane sections 1203 of the hybrid vanes 1210 extend into the vortex generation system 100 by the same radial distance. This results in a discrete geometric jump between the first and second tiers. A reduction of the vane angle of the lower vane section 1203 near the surface results in radial funneling of momentum and thermal energy towards the core of the vortex 140, while reducing the swirl and/or frictional losses within the surface momentum boundary layer 165. The upper vane section 1206 of the hybrid vane 1210 is maintained at a significantly more tangent angle to induce larger azimuthal velocities in the vortex column.

A preliminary study was carried out to examine the impact of the hybrid vane configuration of the vortex generation system 100 of FIG. 12A. The lower vane section 1203 of the hybrid vanes 1210, located near the surface, was constructed with a height of 20% and width of 150% compared to the upper portion of the hybrid vane 1210. The lower vane section 1203 was set at an angle of 15° with respect to the radial direction and the remaining upper vane section 1206 of the hybrid vane 1210 was set at an angle of 60°. Axial and tangential velocity profiles were measured and compared to previously recorded baselines in which the entire vertical extent of the vanes 110 of FIG. 2 was set to angles of 30° and 60°. FIGS. 13A and 13B are plots illustrating the tangential and axial velocities, respectively, when unitary vanes 110 are used at 30° (curves 1303a and 1303b) and 60° (curves 1306a and 1306b), as well as when the hybrid vane geometry is utilized (curves 1309a and 1309b).

In a columnar vortex 140, the radial profile of tangential velocity (v) can be approximated as a Rankine vortex in which solid body rotation is surrounded by a free vortex resulting in a maximum tangential velocity at the core radius ($r_c$). Curves 1303a and 1306a of FIG. 13A exhibit the characteristic maximum. By adding the hybrid vanes 1210 to the flow domain, the tangential velocity (curve 1309a) is no longer representative of this type of flow, but instead displays nominally constant azimuthal velocity with two local maxima, one at the core radius ($r_c$) and another within the outer flow. The resulting flow field is indicative of a vortex core generated by the geometry of the lower vane sections 1203 of the hybrid vanes 1210 (e.g., a small vortex core radius) being coupled to an outer flow imposed by the more tangential upper vane sections 1206 of the hybrid vanes 1210. This results in a tight central column with significant angular momentum present far from the vortex centerline.

Changes to the vortex structure are not limited to the tangential velocity of FIG. 13A, but also affect the radial profile of the axial velocity (w) as illustrated in FIG. 13B. Each baseline vortex for unitary vane angles of 30° and 60° (curves 1303c and 1306c) displays reverse-axial flow along the centerline of the vortex 140 and local maxima at the location of the maximum tangential velocity of curves 1303a and 1306a. Addition of the hybrid vane geometry, the negative axial velocity along the centerline of the vortex 140 is eliminated and a significant increase in the magnitude of the axial velocity of curve 1309b is produced in the flow of the outer region 180. These changes can be attributed to the redistribution of the momentum due the separate control of the lower vane section 1203 and upper vane section 1206 of the hybrid vanes 1210, resulting in a substantial increase in the total axial momentum of the columnar vortex 140.

In addition to the structural changes induced on the engendered vortex, the hybrid vanes 1210 can also lead to a significant redistribution and increase of the axial flux of kinetic energy found within the flow. The radial integral of the axial flux of kinetic energy, Ė, of the baseline vortices using unitary vanes 110 (FIG. 2) can be calculated using:

$$\dot{E} = \int_0^{2\pi} \int_0^{r} \frac{1}{2}\rho V_z(V_z^2 + V_\theta^2) r\, dr\, d\theta,$$

and plotted as a function of radius as curves 1303c (vane angle of 30°) and 1306c (vane angle of 60°) in FIG. 13C, which were non-dimensionalized by the kinetic energy flux of the 30° case (curve 1303c). This measure of the kinetic energy can be approximated as the total amount of available mechanical energy that is available for extraction from the air flow. When the 30° case (curve 1303c) is compared to the 60° case (curve 1306c), a larger kinetic energy flux is produced due to the reduction of downdraft along the vortex centerline.

Through optimization of the vortex generation system 100 using the hybrid vanes 1210, a three-fold increase in the total kinetic energy flux (curve 1309c) can result when compared to the unitary vane geometry at 30°. This increase in the energy may be attributed to the redistribution of angular and axial momentum. This effect results from the lower vane section 1203 of the hybrid vanes 1210, which are located next to the surface, disrupting the "natural" swirling in the surface boundary layer 165 and efficiently funneling momentum and thermal energy into the outer flow. In addition to the increase in flux of thermal energy into the inner vortex core, the boundary layer disruption leads to a reduction of viscous losses imparted on the entrained flow. Therefore, less work is required by the vortex 140 in order to maintain the entrainment of make-up air and thermal energy leading to a more efficient conversion into mechanical energy.

A second mechanism induced by the hybrid vane 1210 is the increase in production and redistribution of axial vorticity and thermal energy into the outer flow. Due to the presence of the lower vanes inside the enclosure, longitudinal vortices are formed between each near-surface vane and advected radially inwards due to the presence of the radial pressure gradient induced by the vortex rotation. These longitudinal vortices are tilted into the vertical direction near the tips of each upper vane section 1206, carrying large amounts of axial momentum and thermal energy into the outer flow. Once tilted vertically, these vortices are advected azimuthally so that they result in a helical, nominally-axisymmetric domain surrounding the inner core located in the outer flow. It is this transport of energy that alters radial profiles of tangential and axial velocity leading to the redistribution of the kinetic energy.

In some implementations, the lower vane section 1203 can be separated from the upper vane section 1206 by a partition that extends around the array of hybrid vanes 1210. For example, the partition can be shaped like a circular washer with a circular opening through the center of the partition, through which the vortex 140 would extend upward. In this way, air would be directed inward through different horizontal sections of the hybrid vane 1210, while minimizing the vertical diffusion until the circular opening is reached. The partitions also prevent ambient wind from entering the facility, passing over the top of the hybrid vanes and disrupting the vortex formation. Other geometric shapes can also be utilized for the partition. For example, if the array includes 8 hybrid vanes 1210, the partition can be shaped like an octagon. The partition can extend inward, between the lower vane section 1203 and upper vane section 1206, from the pivot points 1209 of the hybrid vanes 1210. The width of the partition can be less than or equal to the width of the upper vane section 1206, or can be greater than the width of the upper vane section 1206 but less than the width of the lower vane section 1203. The partition can be constructed from a variety of materials such as, but not limited to, cloth, wood, plastic, metal or other appropriate construction material.

Figure 14A:
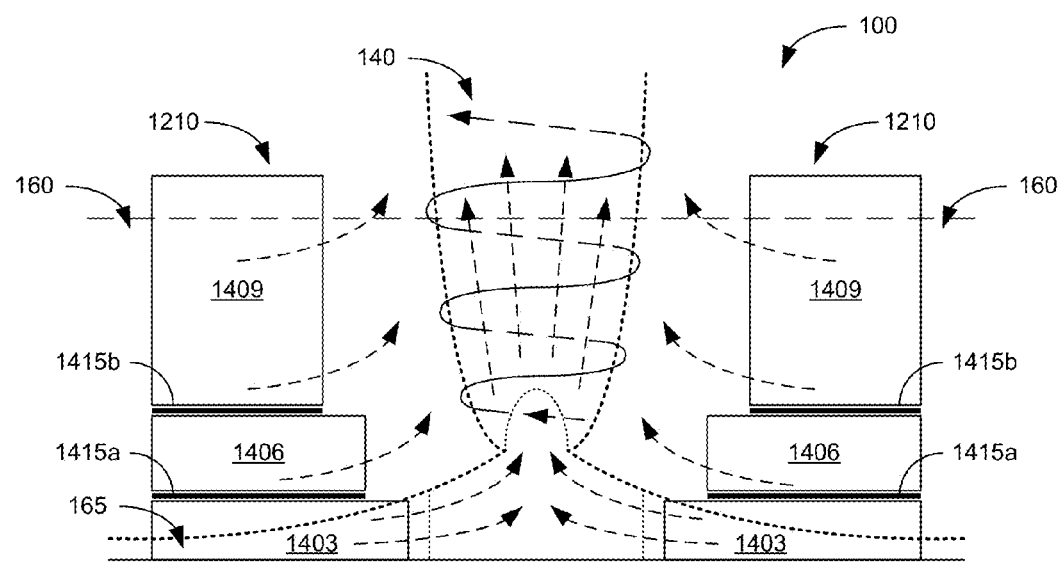
FIGS. 14A, 14B and 15 illustrate examples of vortex generation systems including various hybrid vanes according to various embodiments of the present disclosure.
Figure 14B:
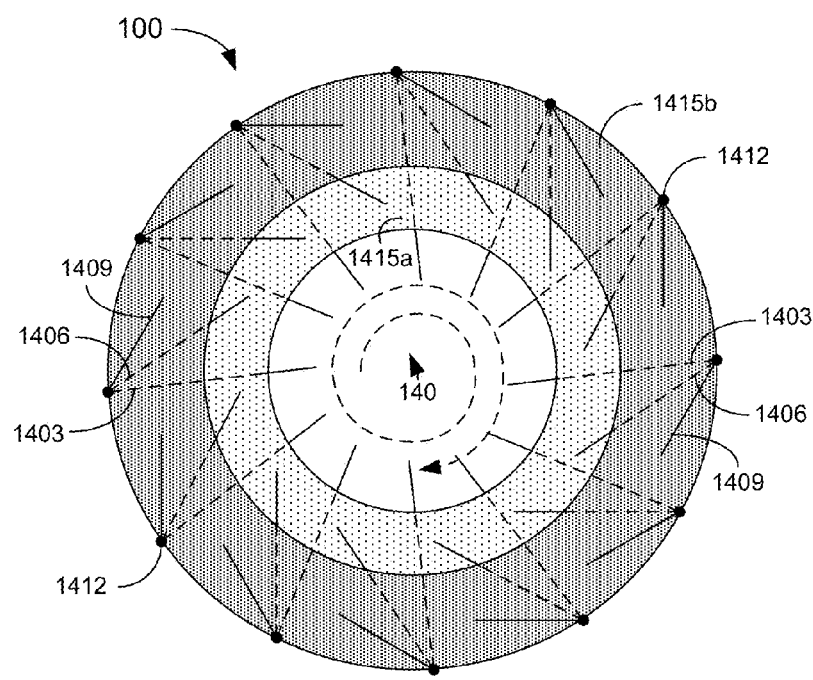

While the example of FIGS. 12A and 12B show twelve hybrid vanes 1210, each with two variable sections, other configurations are also possible. For example, other embodiments of the vortex generation system 100 can include the same or different numbers of hybrid vanes 1210 with three or more tiers of vane sections. The heights and widths of the vane sections, as well as the angular orientation of each tier, can also vary. FIGS. 14A and 14B show cross-sectional and top views of an example of a vortex generation system 100 with the hybrid vanes 1210 including three tiers of vane sections separated by partitions. Each hybrid vane 1210 includes a lower vane section 1403, a middle vane section 1406 and an upper vane section 1409, which pivot about a pivot point 1412. A first partition 1415a is provided between the lower vane section 1403 and middle vane section 1406, and a second partition 1415b is provided between the middle vane section 1406 and the upper vane section 1409. The first partition 1415a can extend inward from the pivot points 1412 about the width of the middle vane section 1406 and the second partition 1415b can extend inward from the pivot points 1412 about the width of the upper vane section 1409. In other embodiments, the width of the first partition 1415a can be less than or equal to the width of the middle vane section 1406, or can be greater than the width of the middle vane section 1406 but less than the width of the lower vane section 1403. The width of the second partition 1415b can be less than or equal to the width of the upper vane section 1409, or can be greater than the width of the upper vane section 1409 but less than the width of the middle vane section 1406.

As can be seen in the top view of FIG. 14B, the three vane sections 1403, 1406 and 1409 can be adjusted to different angles to enhance the radial inflow of the heated air from the surface momentum boundary layer 165 and the thermal boundary layer 160. The partitions 1415 help to horizontally direct that inward airflow toward the center of the vortex generation system 100 to enhance the vortex 140. By adjusting the orientation of the vane sections at different vertical heights, the vortex generation system 100 may compensate for various ambient conditions and/or produce a desired flow structure to optimize the deliberately triggered vortex.

Figure 15:
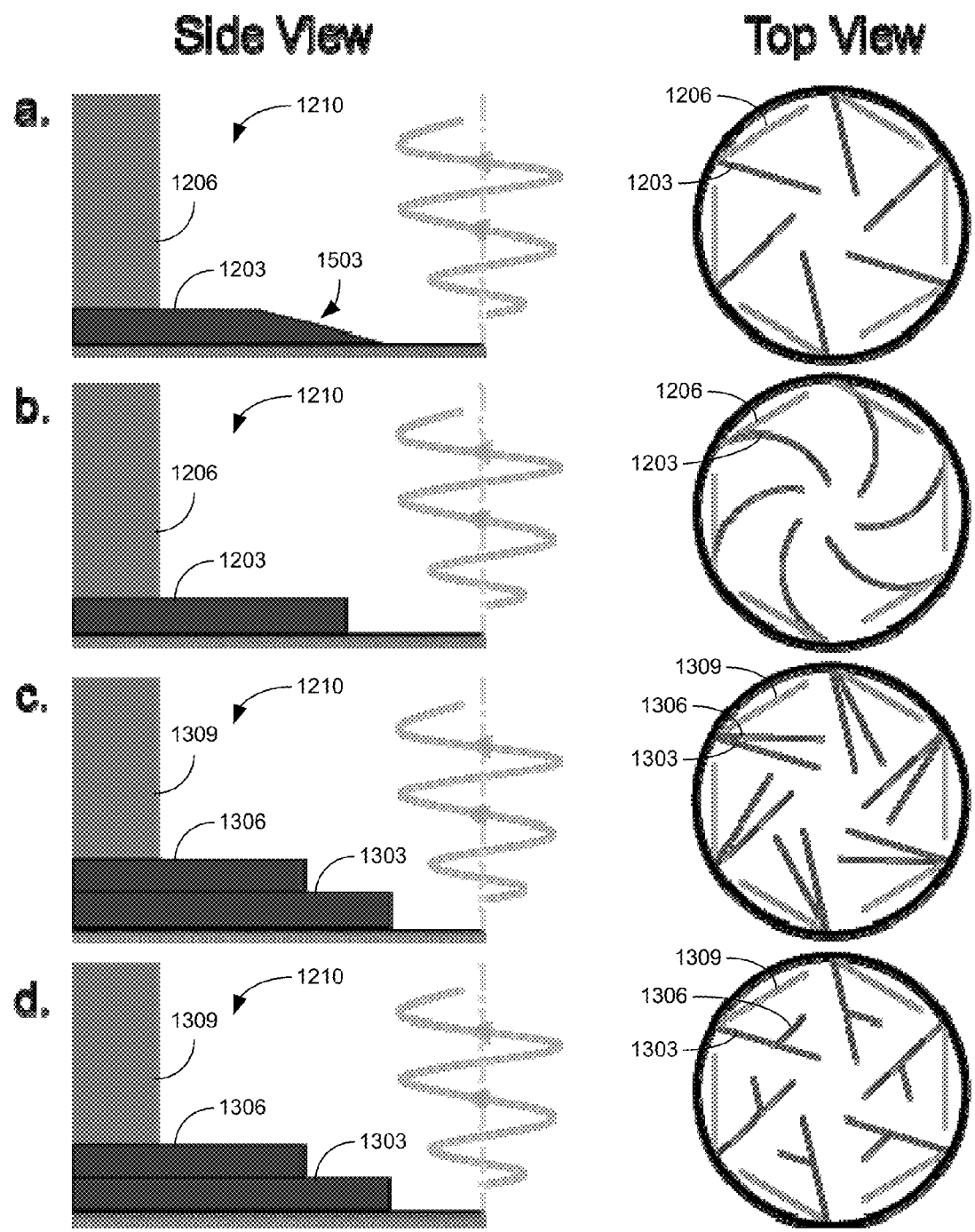

Referring next to FIG. 15, shown are examples of various implementations of the hybrid vanes 1210. In the example of FIG. 15(a), the hybrid vane 1210 includes two tiers with the lower vane section 1203 including a tapered end 1503. As can be seen, the height of the tapered end 1503 decreases with inward radial distance (or increases with outward radial distance). The design of FIG. 15(a) can result in the tilting of the longitudinal vortices (produced between each lower vane section 1203) over a larger radial extent. This change can generate significantly different distributions of axial velocity. The remainder of the design would be so that the entire lower near-surface vane section 1203 would be at a fixed angle that is significantly reduced when compared to the upper vane section 1206 of the second tier. The tapered end 1503 of the lower vane section 1203 could end away from the upper vane section 1206, which would result in a discrete jump within the enclosure as depicted in FIG. 15(a), or could extend back to the edge of the upper vane section 1206.

FIG. 15(b) shows an embodiment were the first tier and/or second tier of vane sections constructed with a curved geometry as shown in the top view. In the example of FIG. 15(b), the hybrid vane 1210 includes two tiers with the lower vane section 1203 having a curved geometry. One of the roles of the array of hybrid vanes 1210 is protection of the engendered vortex from ambient wind. In the embodiments described with straight vane sections, the first tier can include direct pathways that allow wind gusts to enter the flow enclosure unabated and possibly disrupting the vortex formation. By utilizing vane sections with a curved geometry, the uninterrupted radial pathways into the center of the vortex generation system 100 are removed, which prevents disruption of the vortex 140. The mechanisms that the first tier of vane sections produce will continue to occur as the air that is naturally entrained by the vortex 140 will have a reduced path into the vortex core with tangential momentum being imparted by the vane profile. Ambient wind is forced to follow the vane pathway, preconditioning any increased entrainment to beneficially add mass and momentum to the engendered vortex 140, while increasing the amount of available mechanical energy.

The embodiment of FIG. 15(c) is consistent with the example of FIGS. 14A and 14B, with three vertical tiers of vane sections. Each hybrid vane 1210 includes a lower vane section 1403, a middle vane section 1406 and an upper vane section 1409. In the multi-tiered design, the tapering affect is achieved through discrete stages created by each subsequent layer of vane sections extending further into the flow enclosure. The advantage of the geometry of FIG. 15(c) is the ability to prescribe a different angle to each tier, as shown in the top view, providing significantly more control over the structure of the resulting vortex 140. The multi-tiered embodiment is not limited to straight, untapered vane sections, but can include aspects of the geometries described with respect to FIGS. 15(a) and 15(b).

In various embodiments of the vortex generation system 100, the hybrid vanes 1210 can include two or more pivot locations in order to prescribe complex angles to further optimize the flow. In the embodiment of FIG. 15(d), the middle vane sections 1406 of the second tier include two pivot locations, a pivot at the outer end of the vane section and a midpoint pivot. This design can provide similar affects as the curved profiles of FIG. 15(c), with the discrete segments allowing for increased control and reduced manufacturing costs. The second portion of the middle vane sections 1406 is set to a significantly larger angle, with respect to the radial direction, than the first portion. This implementation can increase tangential velocities at a moderate radius while preventing harmful entrainment of ambient wind into the facility without tangential momentum imparted upon it. The prescribed dimension of such a tier can depend on the ambient conditions or the desired flow.

As can be understood, combinations of some or all of the features of the hybrid vanes 1210 can be utilized in a vortex generation system 100. In addition, while the arrays of FIGS. 12A-12B, 14A-14B and 15 are shown with the hybrid vanes 1210 extending inward from an outer circumference of the array, other embodiments can be implemented with the hybrid vanes 1210 extending inward from an inner circumference of the array. In that case, the various vane sections can be pivoted outward to adjust the orientation angle. Partitions between the vane sections would also extend outward from the pivot points.

Referring next to FIGS. 16A through 16C, shown is another example of a hybrid vane 1210 that can be used in the vortex generation system 100. In this case, the pitch of each hybrid vane 1210 can be continuously varied over the vertical height of the hybrid vane 1210 in a fashion similar to a sail. A bottom portion 1603 of the hybrid vanes 1210 can be oriented at a first angle to radially funnel the air in the surface boundary layer 165 towards the vortex core, which supports the formation of axial vorticity as illustrated in the cross-sectional view of FIG. 16A. A top portion 1606 of the hybrid vanes 1210 can be oriented at a more tangent angle (different than the angle of the bottom portion 1603). The pitch of the intermediate portion 1609 of the hybrid vanes 1210 will vary between the top and bottom angles. As shown in FIG. 16A, additional air is drawn into the vortex 140 from the heated thermal boundary layer 160 through the upper and intermediate portions 1606/1609 of the hybrid vanes 1210. By directing the flow of air at the vertically varying angles, the evolution of the vortex 140 can be altered or manipulated by influencing the magnitude and location of momentum transport into the flow enclosure to enhance the flux of kinetic energy.

FIGS. 16B and 16C are perspective and top views, respectively, illustrating the variation in pitch (or angle) over the height of the hybrid vane 1210. The hybrid vanes 1210 can be constructed from a variety of materials such as, but not limited to, cloth, plastic, metal or other appropriate construction material that would allow for the variation in pitch over the height of the hybrid vane 1210. For example, the hybrid vane 1210 can include a rigid bottom portion 1603 and a plurality of stays 1612 that extend horizontally across the hybrid vane 1210 at the top and at various heights, which are configured to pivot along a first side of the hybrid vane 1210. A flexible material (e.g., cloth, plastic, or thin metal sheet) can extend from the bottom portion 1603 to the top of the hybrid vane 1210, between the stays 1612. As illustrated in FIG. 16C, the bottom portion 1603 and the stays 1612 can be oriented at different angles to vary the pitch over the height of the hybrid vane 1210. In this way, the bottom portion 1603 directs air in the surface boundary layer 165 towards the vortex core at a first radial angle, while the top and intermediate portions 1606 and 1609 direct air from the heated thermal boundary layer 160 to the vortex 140 at angles that are increasingly more tangent. In some implementations, shape memory alloy (SMA) can be utilized for the hybrid vanes 1210. The SMA can be activated by the ambient temperature to adjust the positioning of the top and intermediate portions 1606 and 1609 without the need for powered actuators.

As previously discussed, energy can be extracted from the angular and vertical flow of the vortex 140 by placing turbine blades 210 within the stationary columnar vortex 140 as illustrated in FIG. 1. The turbine blades 210 may be located within a housing or cowling 220 to assist in harvesting the tangential and axial momentum of the stationary columnar vortex 140 as depicted in FIG. 1(b), above the array of vanes 110 without a housing or cowling 220, or within the array of vanes 110 as shown in FIG. 5(b). In some embodiments, a vertical axis turbine can be positioned within the stationary columnar vortex 140 to generate power.

Instrumentation can also be included within the vortex generation system 100 for monitoring and control of the system 100. Optical, thermal, and flow sensing devices (e.g., thermocouples and airflow velocity and/or direction sensors) may be distributed within the vortex generation system 100. The instrumentation may be used to monitor characteristics of the stationary columnar vortex 140 such as, but not limited to, axial and tangential air velocities, characteristic radius, and/or air temperature. Signals from the sensing devices can be utilized to control system parameters such as, but not limited to, vane section and/or stay orientations to improve power capture by the system 100.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A vortex generation system, comprising:
a nucleating obstruction that nucleates a columnar vortex from preheated air in a surface momentum boundary layer;
an array of hybrid vanes distributed about the nucleating obstruction, each of the hybrid vanes comprising a first vane section in the surface momentum boundary layer and a second vane section above the first vane section, where:
the first vane section is configured to impart a first angular momentum on the preheated air in the surface momentum boundary layer as the preheated air is drawn through the first vane section to form the columnar vortex over the nucleating obstruction, where the preheated air has been heated in the surface momentum boundary layer over an uncovered surface outside the array of hybrid vanes by surface heating, the uncovered surface extending outward from the array of hybrid vanes; and
the second vane section is configured to impart a second angular momentum on preheated air drawn through the second vane section from a thermal boundary layer outside the array of hybrid vanes; and
a set of turbine blades positioned over the nucleating obstruction, the set of turbine blades configured to extract power from the columnar vortex.

2. The vortex generation system of claim 1, wherein a height of the first vane section is less than a height of the second vane section and a width of the first vane section is greater than a width of the second vane section.

3. The vortex generation system of claim 2, wherein the height of the first vane section is a predefined fraction of the height of the second vane section.

4. The vortex generation system of claim 2, wherein the first and second vane sections extend inward from a pivot point at a proximal end, and the first vane section comprises a tapered end at a distal end opposite the pivot point, a height of the tapered end increasing from the distal end of the first vane section.

5. The vortex generation system of claim 1, wherein each of the hybrid vanes further comprises a third vane section above the second vane section, the third vane section configured to impart a third angular momentum on preheated air drawn through the third vane section from the thermal boundary layer outside the array of hybrid vanes.

6. The vortex generation system of claim 1, further comprising a partition including a central opening, the partition positioned between the first vane section and the second vane section and extending around the array of hybrid vanes.

7. The vortex generation system of claim 6, wherein a width of the partition is approximately a width of the second vane section.

8. The vortex generation system of claim 1, wherein the first vane section has a curved geometry.

9. The vortex generation system of claim 1, wherein the second vane section comprises a first portion configured to pivot about a first end of the second vane section and a second portion configured to pivot about a midpoint of the second vane section.

10. The vortex generation system of claim 1, further comprising:
a generator coupled to the set of turbine blades, the generator configured to generate electrical power from the power extracted by the set of turbine blades.

11. The vortex generation system of claim 1, wherein the surface heating of the preheated air in the surface momentum boundary layer is produced by waste heat.

12. The vortex generation system of claim 11, wherein a position of the vanes is adjusted based upon monitored characteristics of the stationary columnar vortex.

13. A method for power extraction from a buoyancy-induced vortex, comprising:
   establishing a thermal plume;
   imparting angular momentum to preheated boundary layer air entrained by the thermal plume to form a stationary columnar vortex, the angular momentum imparted to the preheated boundary layer air at a plurality of angles by an array of hybrid vanes distributed on a surface about the thermal plume, where the preheated boundary layer air is heated by surface heating in a surface boundary layer along an uncovered surface surrounding and outside the array of hybrid vanes; and
   extracting power from the stationary columnar vortex through turbine blades positioned within the stationary columnar vortex.

14. The method of claim 13, wherein the hybrid vanes of the array comprise a first vane section in the surface boundary layer and an second vane section above the first vane section, where:
   the first vane section is configured to impart angular momentum at a first angle on the preheated boundary layer air in the surface boundary layer as the preheated boundary layer air is drawn through the first vane section; and
   the second vane section is configured to impart angular momentum at a second angle on the preheated boundary layer air drawn through the second vane section from a thermal boundary layer outside the array of hybrid vanes.

15. The method of claim 14, wherein the first vane section is positioned at the first angle and the second vane section is positioned at the second angle.

16. The method of claim 15, wherein positioning of the second vane section is varied to adjust a core diameter of the stationary columnar vortex.

17. The method of claim 13, wherein the hybrid vanes of the array are configured to continuously vary in pitch over a vertical height of the hybrid vanes, the variation in pitch imparting angular momentum to the preheated boundary layer air at the plurality of angles.

18. The method of claim 17, wherein a bottom potion of the hybrid vanes is positioned at a first angle and a top of the hybrid vanes is positioned at a second angle with the pitch of the hybrid vanes continuously varying between the first angle and the second angle.

19. The method of claim 18, wherein the second angle is varied to adjust a core diameter of the stationary columnar vortex.

20. The method of claim 13, wherein the thermal plume is established over a nucleating obstruction.

* * * * *